(12) United States Patent
Sigelakis

(10) Patent No.: US 6,688,326 B1
(45) Date of Patent: Feb. 10, 2004

(54) LOCKING FIRE HYDRANT

(76) Inventor: George Sigelakis, 10 Bulaire Rd., East Rockaway, NY (US) 11518

( * ) Notice: Subject to any disclaimer, the term of this patent is extended or adjusted under 35 U.S.C. 154(b) by 0 days.

(21) Appl. No.: 10/185,420

(22) Filed: Jun. 29, 2002

Related U.S. Application Data

(60) Provisional application No. 60/302,110, filed on Jun. 30, 2001.

(51) Int. Cl.[7] .............................. F16K 35/10; E03B 9/06
(52) U.S. Cl. ...................... 137/296; 70/163; 137/15.02; 137/315.41; 137/382; 137/800; 220/284; 220/724; 220/725
(58) Field of Search ................................. 137/296, 800, 137/315.41, 15.02, 377, 382, 382.5; 70/163, 164; 81/176.1, 176.3, 119, 120, 176.15; 220/284, 724, 725; 29/213.1, 221.6

(56) References Cited

U.S. PATENT DOCUMENTS

| | | | | |
|---|---|---|---|---|
| 468,782 A | * | 2/1892 | Brentano | 137/296 |
| 3,456,463 A | * | 7/1969 | Mihalich | 137/296 |
| 3,914,966 A | * | 10/1975 | Bello | 137/296 |
| 4,182,361 A | * | 1/1980 | Oakey | 137/296 |
| 4,280,525 A | * | 7/1981 | Byrnes | 137/296 |
| 5,549,133 A | * | 8/1996 | Sigelakis | 137/296 |
| 6,089,253 A | * | 7/2000 | Stehling | 137/296 |
| 6,112,761 A | * | 9/2000 | Scotto | 137/296 |

* cited by examiner

Primary Examiner—George L. Walton
(74) Attorney, Agent, or Firm—Martine & Penilla, LLP

(57) ABSTRACT

A locking fire hydrant includes a fire hydrant body having an outlet port, a valve access hole, and an outer surface with a recess defined therein. The recess is configured to receive a locking cap for closing off the outlet port and the valve access hole. A locking cap for closing off the outlet port and the valve access hole is mounted on the fire hydrant body such that the locking cap is received in the recess defined in the outer surface of the fire hydrant body. The recess shields an interface between the locking cap and the fire hydrant body from access by unauthorized tools. A fire hydrant body, a method for restricting unauthorized access to a fire hydrant, and a method for locking an auxiliary cap to a fire hydrant also are described.

29 Claims, 22 Drawing Sheets

Fig. 4C-1
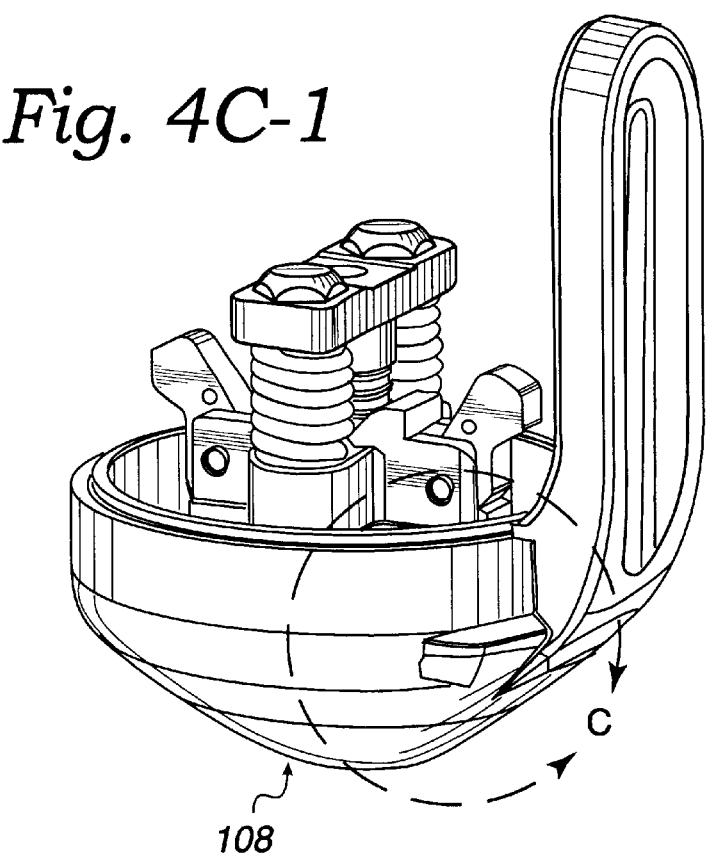
108
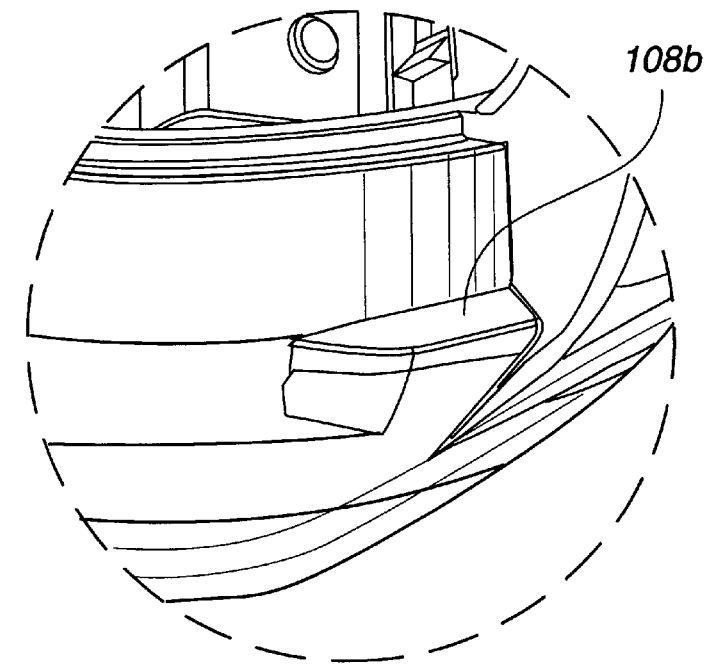
108b
Fig. 4C-2

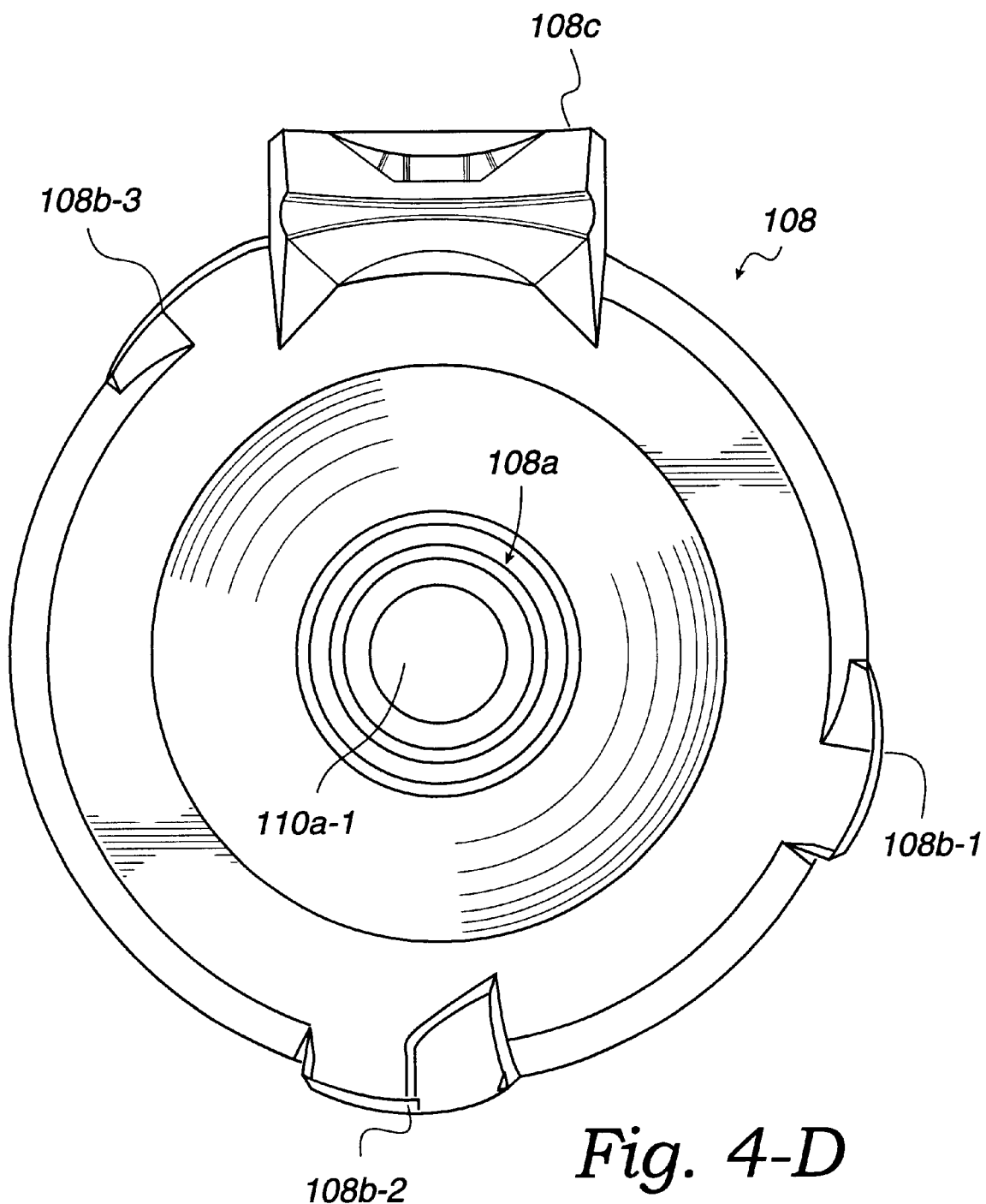
Fig. 4-D

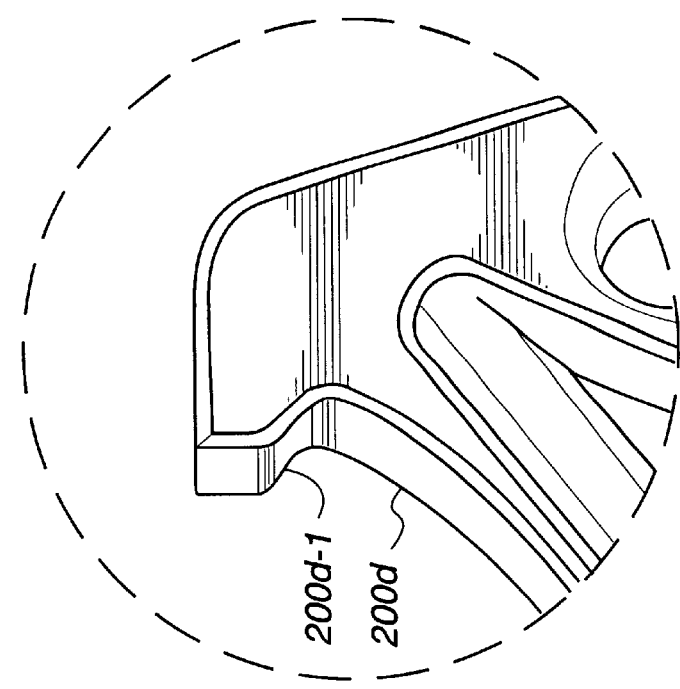
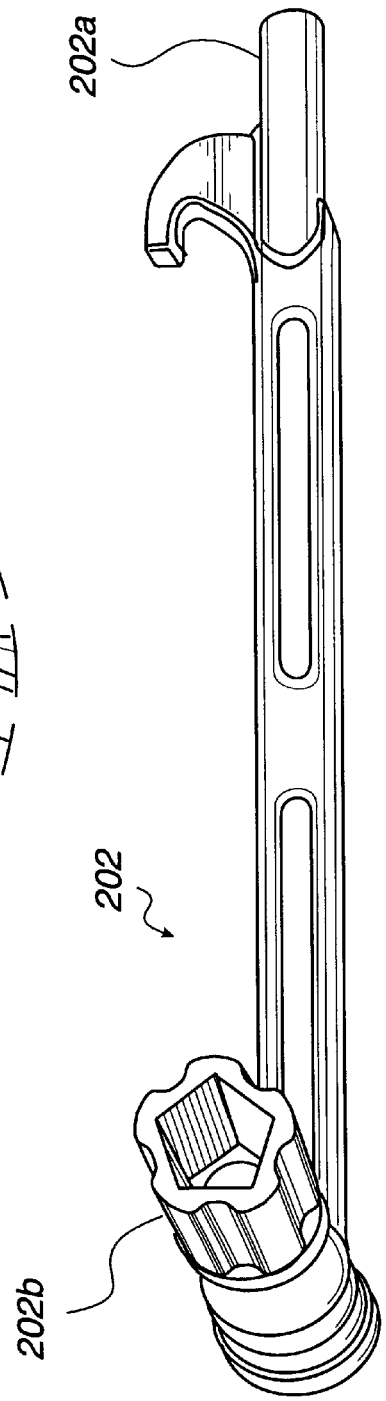
Fig. 5B-2
Fig. 5C

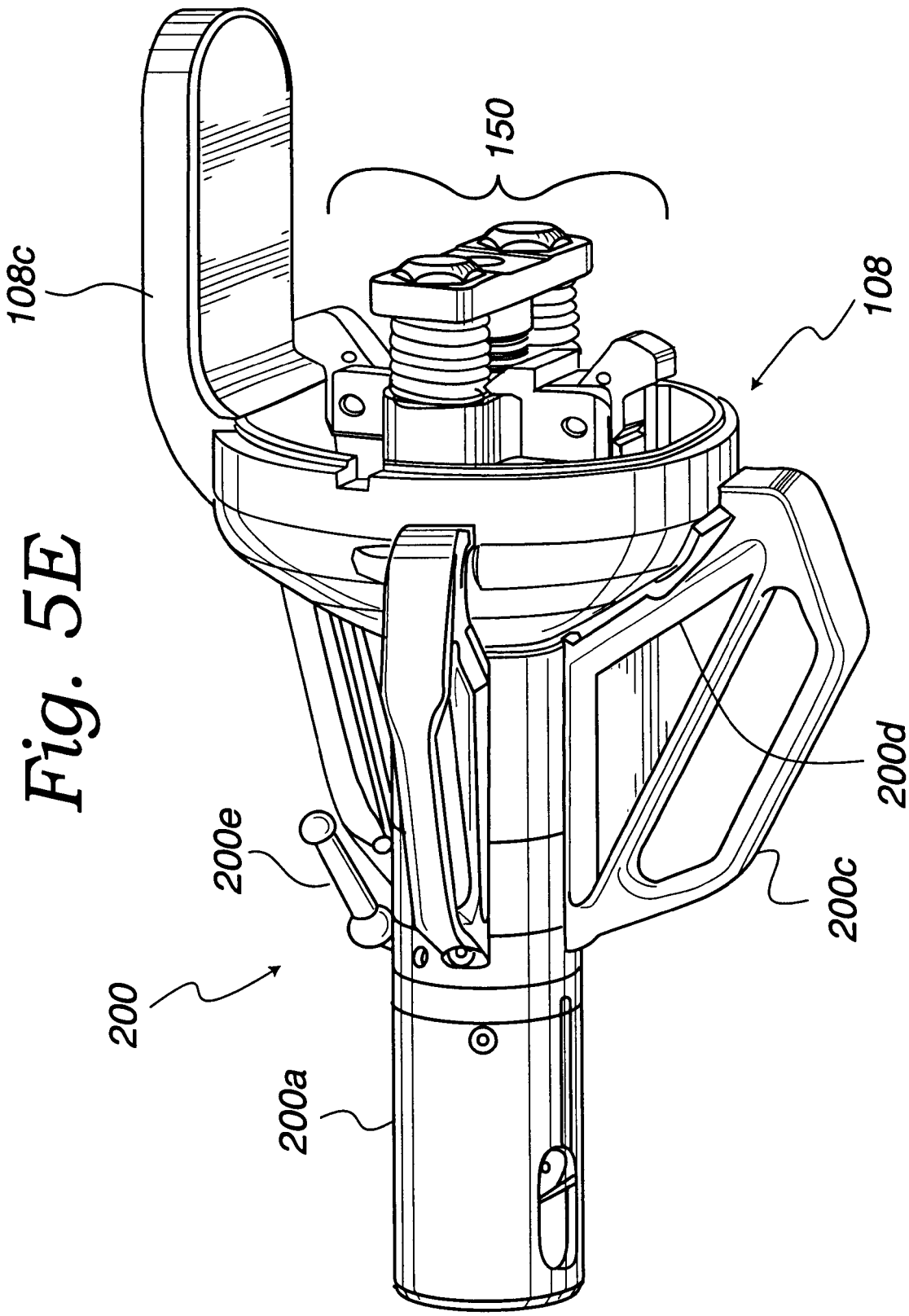

LOCKING FIRE HYDRANT

CLAIM FOR PRIORITY

This application claims priority under 35 U.S.C. §119(e) from U.S. Provisional Patent Application No. 60/302,110, filed Jun. 30, 2001, and entitled "Locking Fire Hydrant." The disclosure of this provisional application is incorporated herein by reference.

BACKGROUND OF THE INVENTION

The present invention relates generally to fire hydrants and, more particularly, to a locking fire hydrant, a fire hydrant body, and a method for restricting unauthorized access to a fire hydrant.

Firefighters need quick and reliable access to water to fight fires safely and effectively. Unfortunately, it is relatively easy for unauthorized users to gain access to the fire hydrants currently installed in most major metropolitan areas. Unauthorized use of fire hydrants is problematic because it wastes water, endangers firefighters and the communities they serve by lowering the water pressure to the point that water cannot be moved from the fire hydrant to the engine pumper, and requires that significant amounts of labor and money be expended to repair or replace the damaged fire hydrants.

In view of the foregoing, there is a need for a fire hydrant that can effectively withstand repeated attempts to gain unauthorized access thereto.

SUMMARY OF THE INVENTION

Broadly speaking, the present invention fills this need by providing a locking fire hydrant that includes a locking cap mounted on a hydrant body that is configured to protect the locking cap from being tampered with by unauthorized users.

In accordance with one aspect of the invention, a locking fire hydrant is provided. The locking fire hydrant includes a fire hydrant body having an outlet port, a valve access hole, and an outer surface with a recess defined therein. The recess is configured to receive a locking cap for closing off the outlet port and the valve access hole. A locking cap for closing off the outlet port and the valve access hole is mounted on the fire hydrant body such that the locking cap is received in the recess defined in the outer surface of the fire hydrant body.

In one embodiment, the locking cap is secured to the fire hydrant body with a short travel, quick action latching mechanism that includes tongs configured to grab an inner surface of the fire hydrant body. In one embodiment, the short travel, quick action latching mechanism is actuated by a shaft that extends through an aperture in the locking cap. In one embodiment, the shaft has a mushroom head and the aperture in the locking cap is defined by a first surface that defines a first cone and a second surface that defines a second cone.

In one embodiment, an outer surface of the locking cap is provided with lugs configured to serve as gripping points for a tool configured to remove the locking cap. In one embodiment, the lugs are provided with a back chamfer. In one embodiment, the lugs are radially spaced around a perimeter of the locking cap at unequal radial positions such that no two lugs are diametrically opposed to one another.

In one embodiment, the fire hydrant body has a head that defines a hollow interior. The head has a main outlet port, a valve access hole, and an outer surface configured to define a main cap recess that surrounds the main outlet port and a valve access channel that extends between the main cap recess and the valve access hole. In this embodiment, the locking cap, which is configured to close off the main outlet port and the valve access hole, is mounted on the fire hydrant body such that the main cap recess and the valve access channel shield an interface between the locking cap and the head of the fire hydrant body from access by unauthorized tools. As used in connection with the description of the invention, the term "unauthorized tools" refers to sledgehammers, pry bars, chisels, wheel pullers, jacks, and other implements that unauthorized users might use to open or damage the fire hydrant.

In one embodiment, the head of the fire hydrant body has an auxiliary outlet port. The outer surface of the head is configured to define an auxiliary cap recess that surrounds the auxiliary outlet port and an auxiliary cap locking slot that extends between the main cap recess and the auxiliary cap recess. An auxiliary cap for closing off the auxiliary outlet port is mounted on the fire hydrant body such that the auxiliary cap recess shields an interface between the auxiliary cap and the head of the fire hydrant body from access by unauthorized tools.

In one embodiment, the auxiliary cap has a pivot arm with a ledge at an end thereof. In one embodiment, the pivot arm is configured to be seated in the auxiliary cap locking slot such that the ledge extends into the main cap recess. In one embodiment, the locking cap is mounted on the fire hydrant body such that the locking cap pins the ledge of the auxiliary cap pivot arm in the main cap recess and thereby locks the auxiliary cap to the fire hydrant body. In one embodiment, the locking cap has a tongue extending therefrom, and the valve access channel is configured to receive the tongue.

In accordance with another aspect of the invention, a fire hydrant body is provided. The fire hydrant body includes a head having an outlet port and a valve access hole. The head also has an inner surface and an outer surface, with the inner surface defining a hollow interior and the outer surface having a recess defined therein. The recess surrounds the outlet port and extends to the valve access hole. In one embodiment, the outlet port is a main outlet port and the head further includes an auxiliary outlet port. In this embodiment, the outer surface has a recess surrounding the auxiliary outlet port defined therein. In one embodiment, the outer surface of the head has a recess that extends between the main outlet port recess and the auxiliary output port recess defined therein.

In accordance with yet another aspect of the invention, a method for restricting unauthorized access to a fire hydrant is provided. In this method, a fire hydrant body having an outlet port, a valve access hole, and an outer surface with a recess formed therein is provided. A locking cap for closing off the outlet port and the valve access hole is mounted on the fire hydrant body such that the recess shields an interface between the locking cap and the fire hydrant body from access by unauthorized tools.

In accordance with a further aspect of the invention, a method for locking an auxiliary cap to a fire hydrant is provided. In this method, an arm attached to an auxiliary cap is positioned so that a portion of the arm is disposed in a recess surrounding a main outlet port of a fire hydrant. A locking cap for closing off the main outlet port is mounted on the fire hydrant such that the locking cap pins the portion of the arm attached to the auxiliary cap in the recess surrounding the main outlet port.

The locking fire hydrant of the present invention can effectively withstand aggressive attempts to gain unauthorized access thereto because the hydrant body shields the components mounted thereon, e.g., the locking cap and the auxiliary cap, from being accessed by unauthorized tools. Consequently, the locking fire hydrant of the present invention is more reliable than conventional fire hydrants used in major metropolitan areas. In addition, the locking fire hydrant of the present invention is readily accessible in that firefighters can remove the locking cap from the hydrant body quickly, e.g., in about 5 seconds, using the removal tool. By essentially eliminating unauthorized use thereof, the locking fire hydrant of the present invention not only conserves water, but also ensures that there will be sufficient water pressure available to move water from an open hydrant to an engine pumper. The locking fire hydrant also prevents damage to fire hydrants caused by foreign objects placed in the hydrants when unauthorized persons open them. Thus, the locking fire hydrant of the present invention helps firefighters get water to fires quickly and reliably and thereby helps create a safer environment for firefighters and the communities they serve.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIGS. 4A-1 and 4A-2 are front views of the locking cap secured to the fire hydrant body in accordance with one embodiment of the invention, with FIG. 4A-2 being an enlarged view of the portion of the locking cap indicated by the circle labeled A in FIG. 4A-1.

FIGS. 4B-1 and 4B-2 are cross-sectional views of the locking cap secured to the fire hydrant body in accordance with one embodiment of the invention, with FIG. 4B-2 being an enlarged view of the portion of the locking cap indicated by the circle labeled B in FIG. 4B-1.

FIGS. 4C-1 and 4C-2 are side views of the locking cap, with FIG. 4C-2 being an enlarged view of the portion of the locking cap indicated by the circle labeled C in FIG. 4C-1.

FIG. 4D is a front view of the locking cap that illustrates exemplary locations at which lugs may be disposed around the periphery of the locking cap.

FIGS. 5B-1 and 5B-2 show another view of the removal tool, with FIG. 5B-2 being an enlarged view of the portion of the removal tool indicated by the circle labeled D in FIG. 5B-1.

FIG. 5C is a perspective view of the hand wrench in accordance with one embodiment of the invention.

FIG. 5E shows the locking cap and the removal tool after the locking cap has been removed from the head of the fire hydrant body in accordance with one embodiment of the invention.

FIGS. 7A-1 and 7A-2 are cross-sectional views of the locking cap secured to the fire hydrant body in accordance with one embodiment of the invention, with FIG. 7A-2 being an enlarged view of the portion of the locking cap indicated by the circle labeled E in FIG. 7A-1.

FIGS. 8-1 and 8-2 are cross-sectional views of the locking cap secured to the fire hydrant body in accordance with one embodiment of the invention, with FIG. 8-2 being an enlarged view of the portions of the locking cap and the fire hydrant body indicated by the circle labeled F in FIG. 8-1.

DETAILED DESCRIPTION OF EXEMPLARY EMBODIMENTS

Several exemplary embodiments of the invention will now be described in detail with reference to the accompanying drawings.

Figure 1:
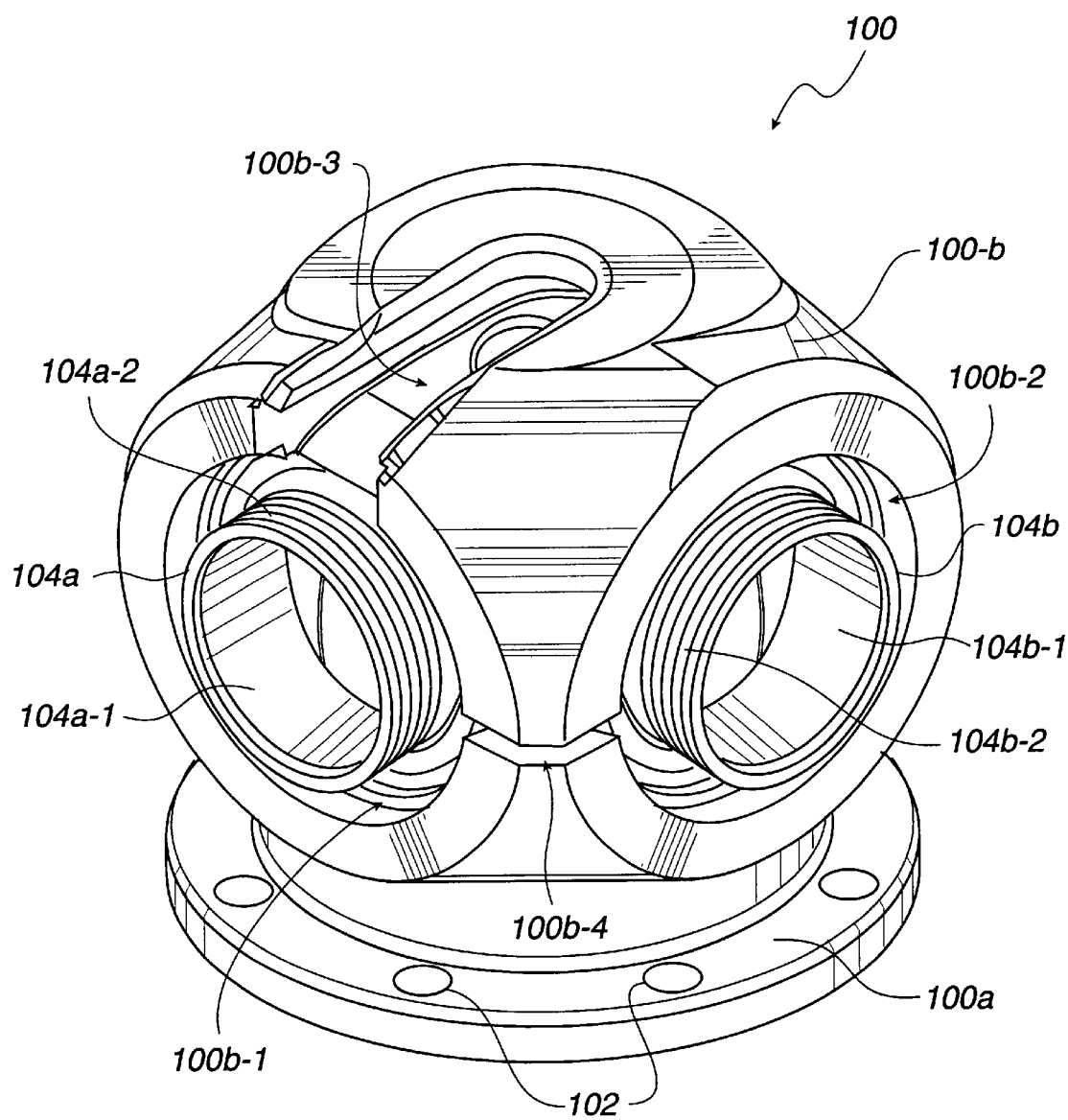
FIG. 1 is a perspective view of a fire hydrant body in accordance with one embodiment of the invention.

FIG. 1 is a perspective view of fire hydrant body 100 in accordance with one embodiment of the invention. As shown in FIG. 1, fire hydrant body 100 includes base 100*a* and head 100*b*. Base 100*a* has a plurality of holes 102 therethrough that are configured to receive bolts for fastening base 100*a* to a standpipe. As shown in FIG. 1, base 100*a* is a generally circular flange that extends from the lower portion of head 100*b*; however, it will be apparent to those skilled in the art that the configuration of the base may be varied to meet the needs of particular situations. Fire hydrant body 100, as well as the other components of the locking fire hydrant described below, may be made of any material having suitable strength and ductility, e.g., stainless steel and ductile cast iron.

Head 100*b* defines a hollow interior and has a generally rounded outer configuration that includes a number of recessed portions that are configured to protect components mounted thereon. In particular, head 100*b* includes main cap recess 100*b*-1, auxiliary cap recess 100*b*-2, valve access channel 100*b*-3, and auxiliary cap slot 100*b*-4. Main cap recess 100*b*-1 surrounds cylinder 104*a*, which has inner surface 104*a*-1 and outer surface 104*a*-2. Inner surface 104*a*-1 defines a main outlet port of head 100*b* and outer surface 104a-2 is threaded so that a complementarily threaded coupling member of a fire hose can be fastened thereon, as is well known to those skilled in the art. Auxiliary cap recess 100b-2 surrounds cylinder 104b, which has inner surface 104b-1 and outer surface 104b-2. Inner surface 104b-1 defines an auxiliary outlet port of head 100b and outer surface 104b-2 is threaded so that either a complementarily threaded coupling member of a fire hose or a threaded cap can be fastened thereon. Valve access channel 100b-3 is formed in the upper portion of head 100b and is configured to receive a tongue that extends from a locking cap (see, for example, tongue 108c in FIG. 3D) to prevent access to a valve control device disposed within fire hydrant body 100, as will be described in more detail later. Additional details regarding the configuration of valve access channel 100b-3 are described below with reference to FIGS. 2, 8-1, and 8-2. Auxiliary cap slot 100b-4 extends between main cap recess 100b-1 and auxiliary cap recess 100b-2. Auxiliary cap slot 100b-4 is configured to receive an auxiliary cap pivot arm, as will be described in more detail later.

Figure 2:
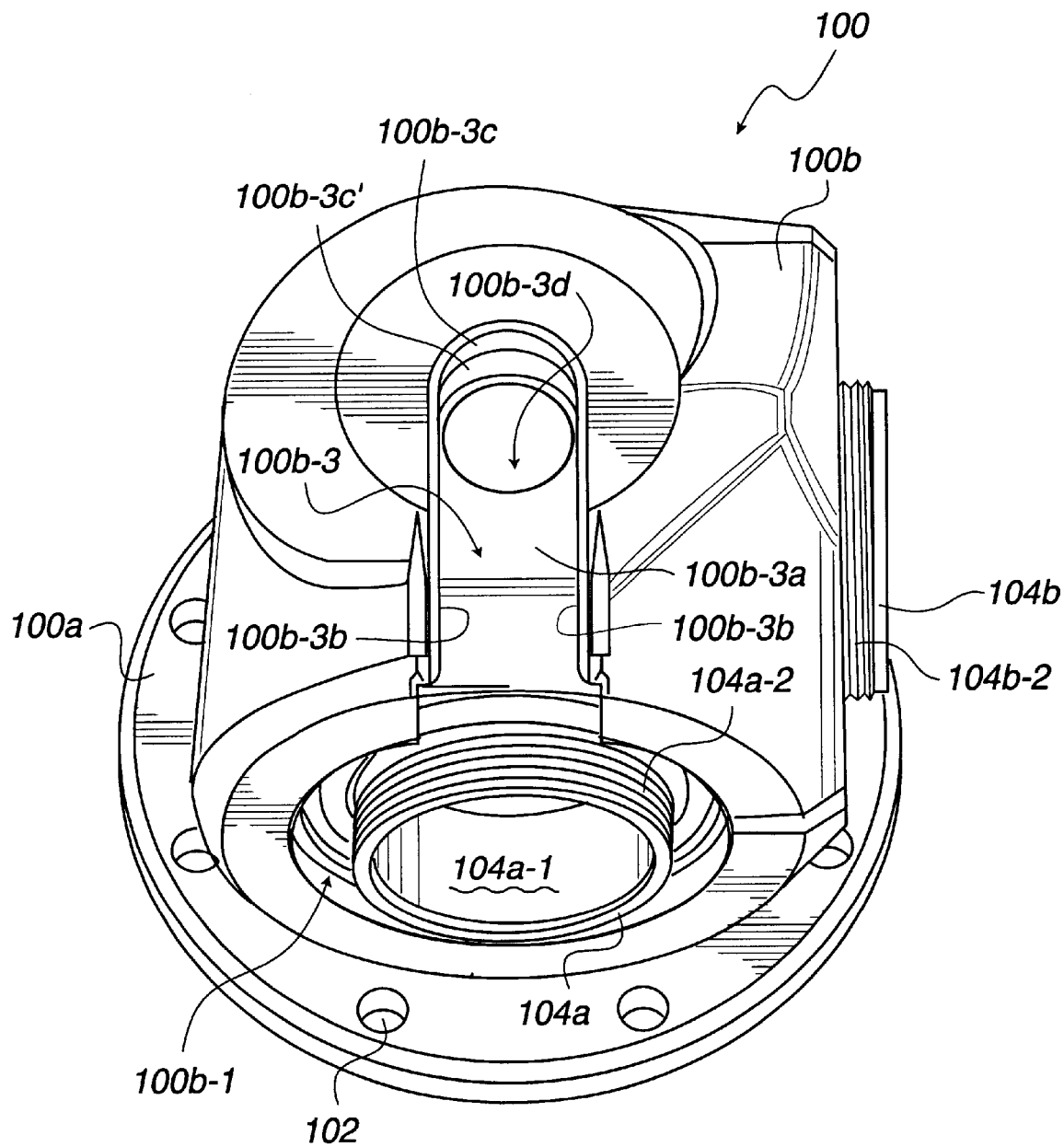
FIG. 2 is a top view of the head of the fire hydrant body that shows the configuration of the valve access channel in accordance with one embodiment of the invention.

FIG. 2 is a top view of head 100b that shows the configuration of valve access channel 100b-3. As shown in FIG. 2, valve access channel 100b-3 is defined by channel base 100b-3a, channel sidewalls 100b-3b, upper channel end wall 100b-3c, and lower channel end wall 100b-3c'. Valve access hole 100b-3d extends through channel base 100b-3a to provide access to the interior of head 100b for purposes of opening or closing the valve control device disposed therein. Upper channel end wall 100b-3c and lower channel end wall 100b-3c' have a curved configuration and the relative positions of these end walls is staggered, as described in more detail below with reference to FIGS. 8-1 and 8-2.

Figure 3A:
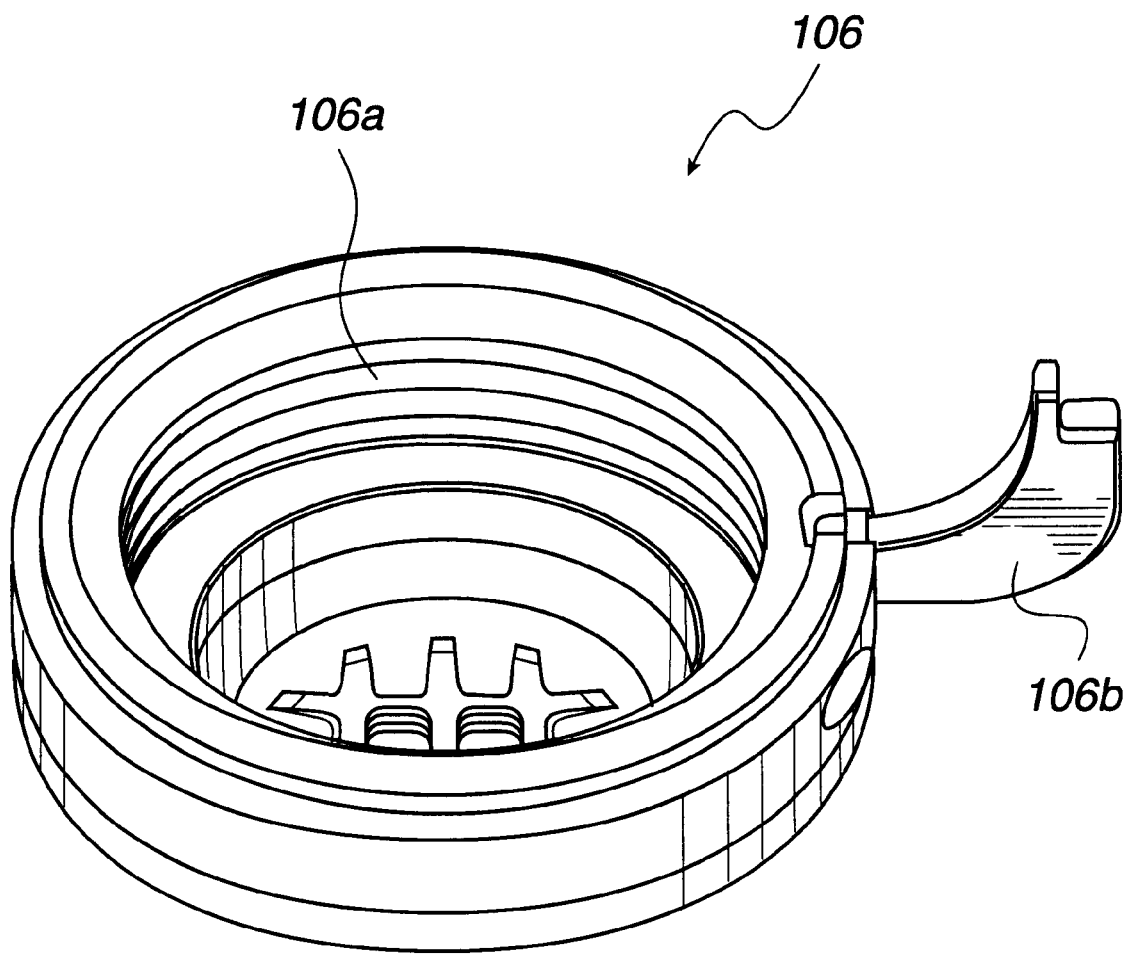
FIG. 3A is a view of the interior of the auxiliary cap in accordance with one embodiment of the invention.

FIG. 3A is a view of the interior of the auxiliary cap in accordance with one embodiment of the invention. As shown in FIG. 3A, the interior of auxiliary cap 106 includes threaded portion 106a, which enables the auxiliary cap to be mounted on head 100b of fire hydrant body 100 so as to close off the auxiliary outlet port. In particular, auxiliary cap 106 is mounted on head 100b by twisting threaded portion 106a onto threaded outer surface 104b-2 of cylinder 104b. Auxiliary cap pivot arm 106b, which is pivotally connected to the outer edge of auxiliary cap 106, is used both to mount and also to lock the auxiliary cap.

Figure 3B:
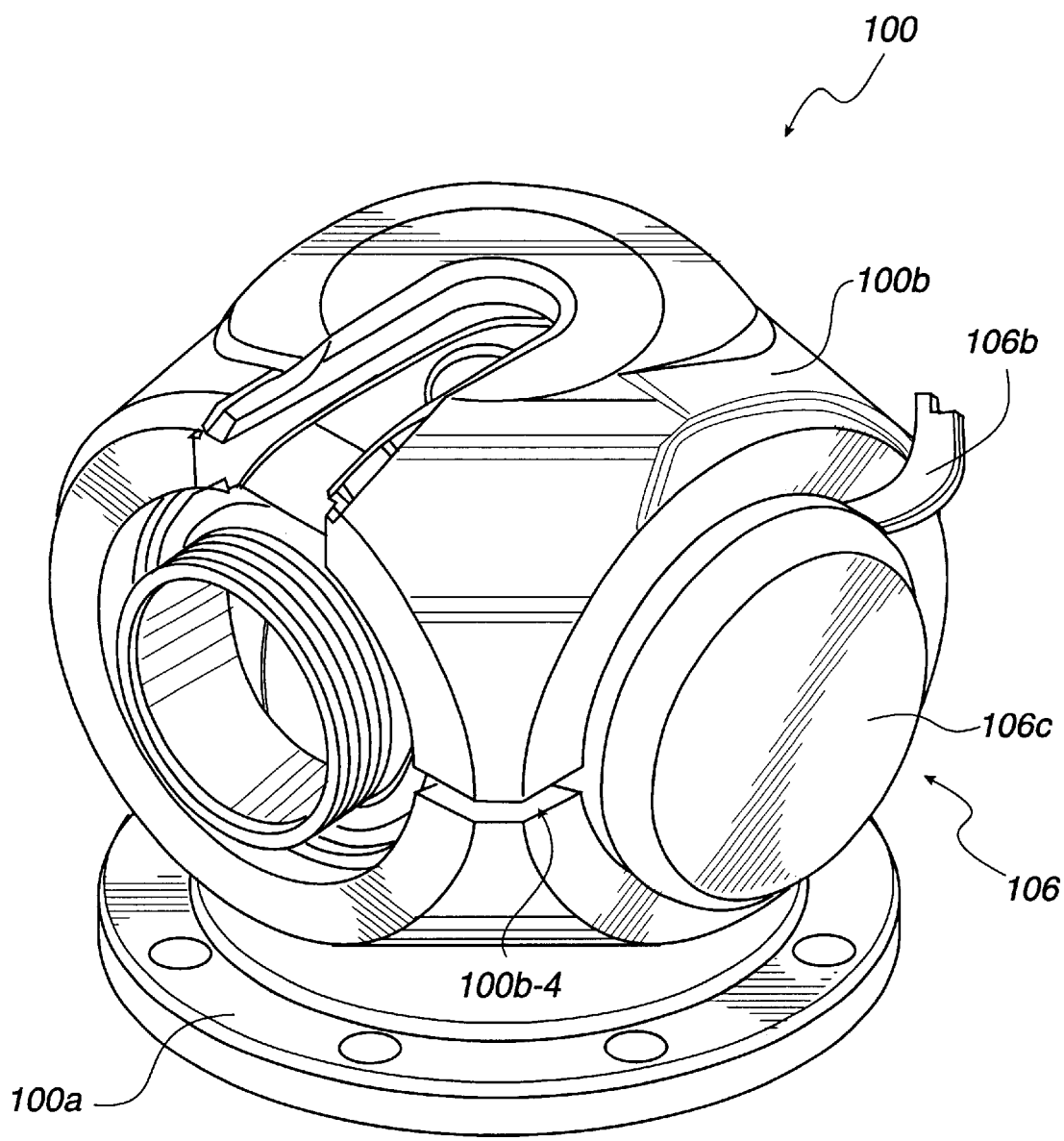
FIG. 3B shows the auxiliary cap as the auxiliary cap is being mounted on the head of the fire hydrant body in accordance with one embodiment of the invention.

FIG. 3B shows auxiliary cap 106 as the auxiliary cap is being mounted on head 100b of fire hydrant body 100. As shown in FIG. 3B, auxiliary cap pivot arm 106b is in the retracted position. In this position, auxiliary cap pivot arm 106b can be used during the mounting process to twist auxiliary cap 106. Once auxiliary cap 106 is in place, auxiliary cap pivot arm 106b can be used to lock the auxiliary cap to head 100b of fire hydrant body 100. Front face 106c of auxiliary cap 106 is preferably sloped to deflect blows from sledgehammers or other tools that vandals might use in attempts to open or otherwise damage the auxiliary cap.

Figure 3C:
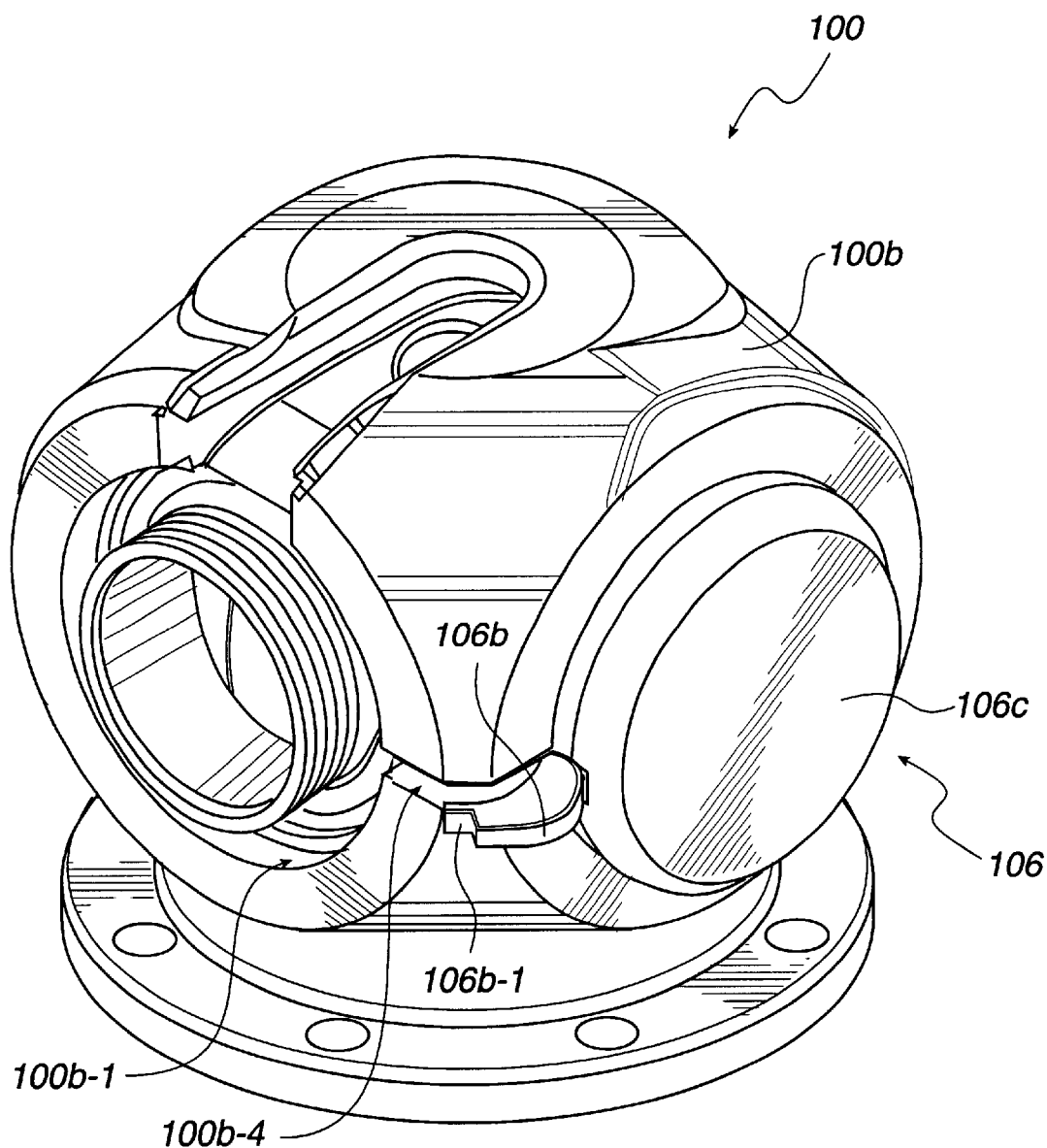
FIG. 3C shows the auxiliary cap pivot arm as the pivot arm is being moved into the auxiliary cap locking slot of the head of the fire hydrant body in accordance with one embodiment of the invention.

FIG. 3C shows auxiliary cap pivot arm 106b as the pivot arm is being moved into auxiliary cap locking slot 100b-4 of head 100b. As shown in FIG. 3C, auxiliary cap pivot arm 106b is provided with ledge 106b-1 that is configured to extend beyond auxiliary cap locking slot 100b-4 and into main cap recess 100b-1. Thus, when auxiliary cap pivot arm 106b is in the fully extended position such that the pivot arm is seated in auxiliary cap locking slot 100b-4, ledge 106b-1 extends into main cap recess 100b-1.

Figure 3D:
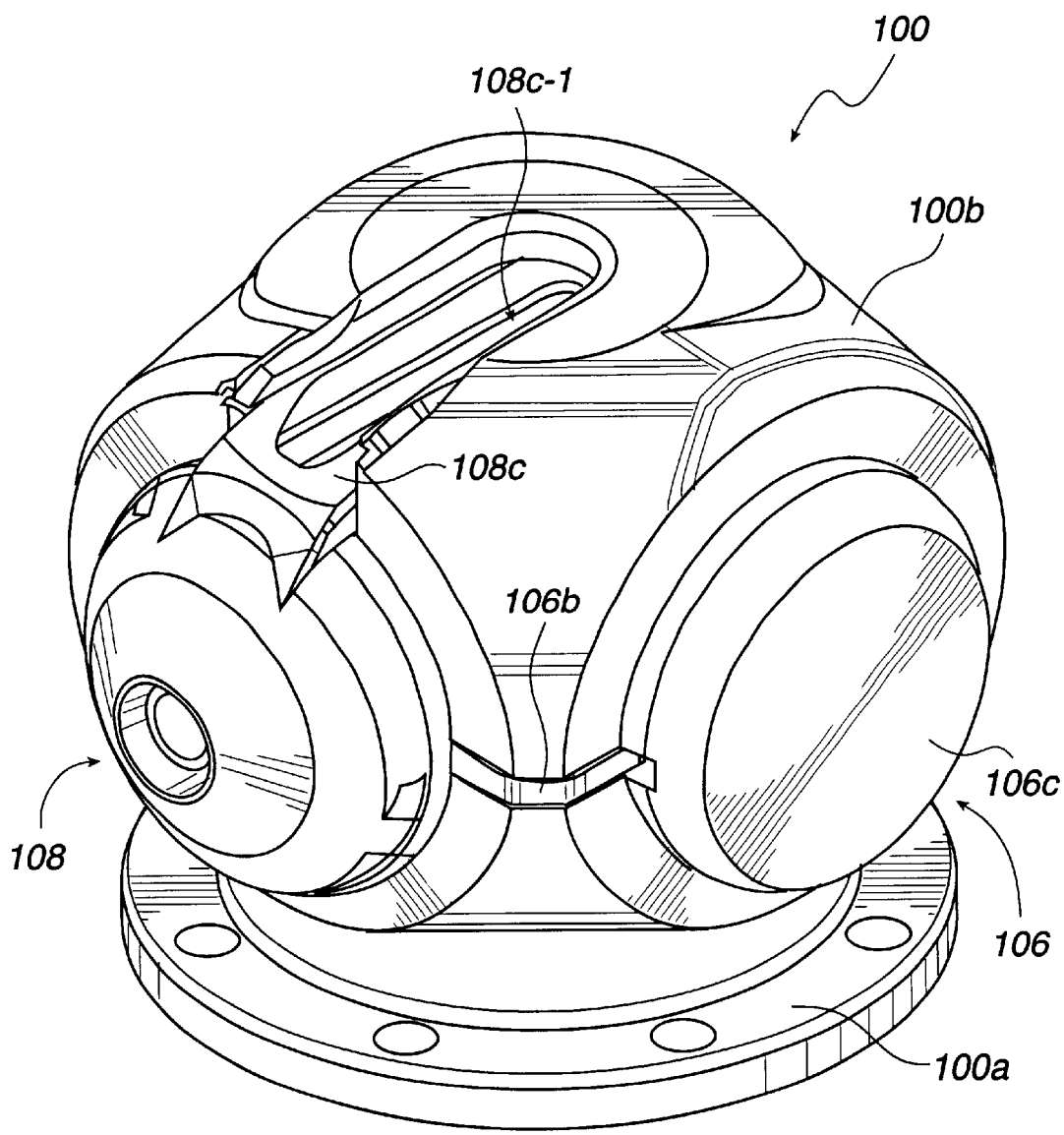
FIG. 3D shows the fire hydrant body with the locking cap and the auxiliary cap secured thereto in accordance with one embodiment of the invention.

FIG. 3D shows fire hydrant body 100 with locking cap 108 and auxiliary cap 106 secured thereto in accordance with one embodiment of the invention. As shown therein, locking cap 108 is mounted on head 100b of fire hydrant body 100 such that the main cap recess and the valve access channel shield the interface between the locking cap and the head from access by unauthorized tools. Auxiliary cap 106 is mounted on head 100b such that the auxiliary cap recess shields the interface between the auxiliary cap and the head from access by unauthorized tools. Locking cap 108 is secured to fire hydrant body 100 with a latching mechanism that includes tongs that grab the interior of the fire hydrant body. Additional details regarding the latching mechanism are described below with reference to FIGS. 6A–6C. When the latching mechanism secures locking cap 108 to fire hydrant body 100, the locking cap in turn secures auxiliary cap 106 to the fire hydrant body by pinning ledge 106b-1 of auxiliary cap pivot arm 106b within main cap recess 100b-1 (see FIG. 3C). As shown in FIG. 3D, the top surface of tongue 108c of locking cap 108 has channel 108c-1 formed therein. Additional details regarding the channel formed in the tongue of the locking cap are described below with reference to FIGS. 8-1 and 8-2.

Figures 1, 4A:
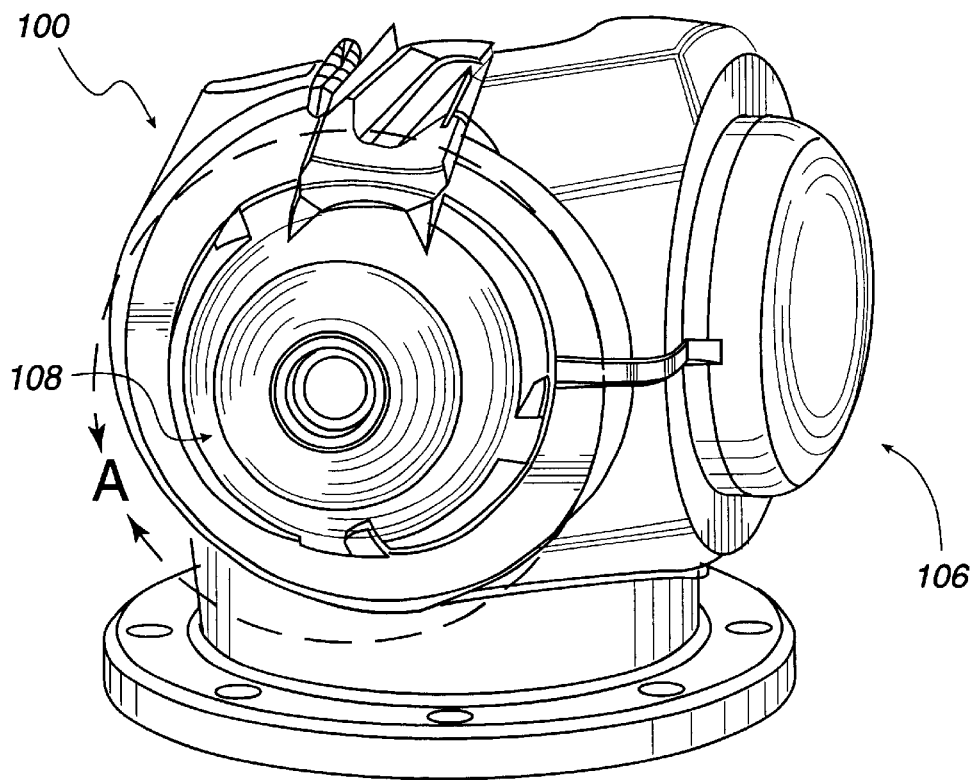
Figures 2, 4A:
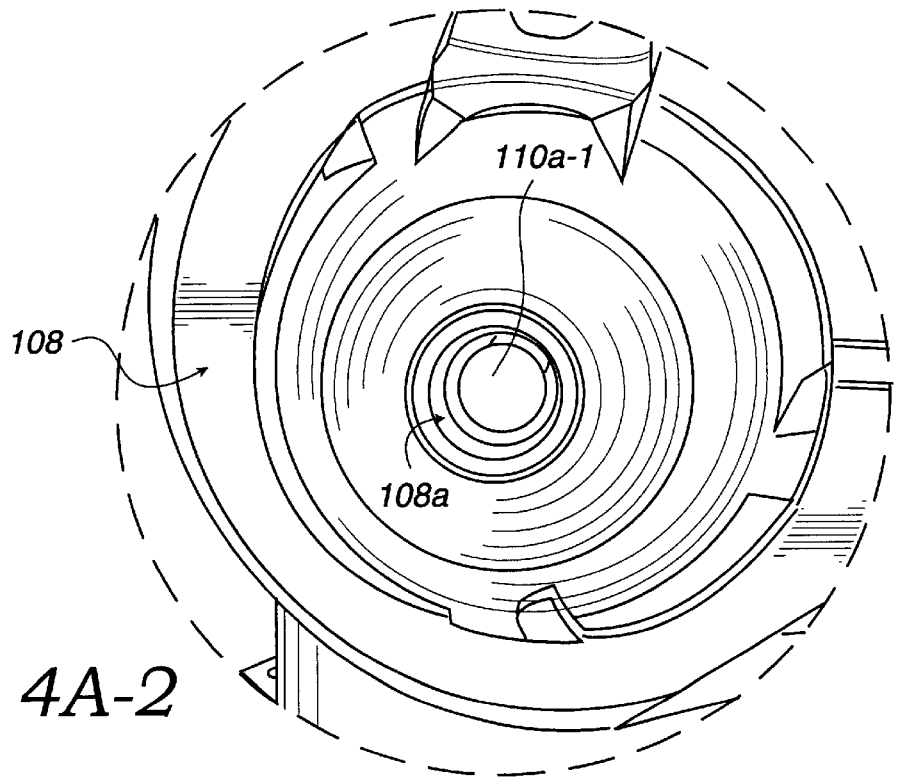

FIGS. 4A-1 and 4A-2 are front views of locking cap 108 secured to fire hydrant body 100 in accordance with one embodiment of the invention, with FIG. 4A-2 being an enlarged view of the portion of the locking cap indicated by the circle labeled A in FIG. 4A-1. As shown in FIG. 4A-2, front shaft 110a extends through aperture 108a of locking cap 108. Movement of shaft 110, which includes front shaft 110a and back shaft 110b (see FIG. 6A), actuates the latching mechanism that is coupled to the interior of locking cap 108, as will be described in more detail later. Mushroom head 110a-1 and the inner surface of locking cap 108 that defines aperture 108a are configured to resist tampering by vandals, as described in more detail with reference to FIGS. 4B-1 and 4B-2.

Figures 1, 4B:
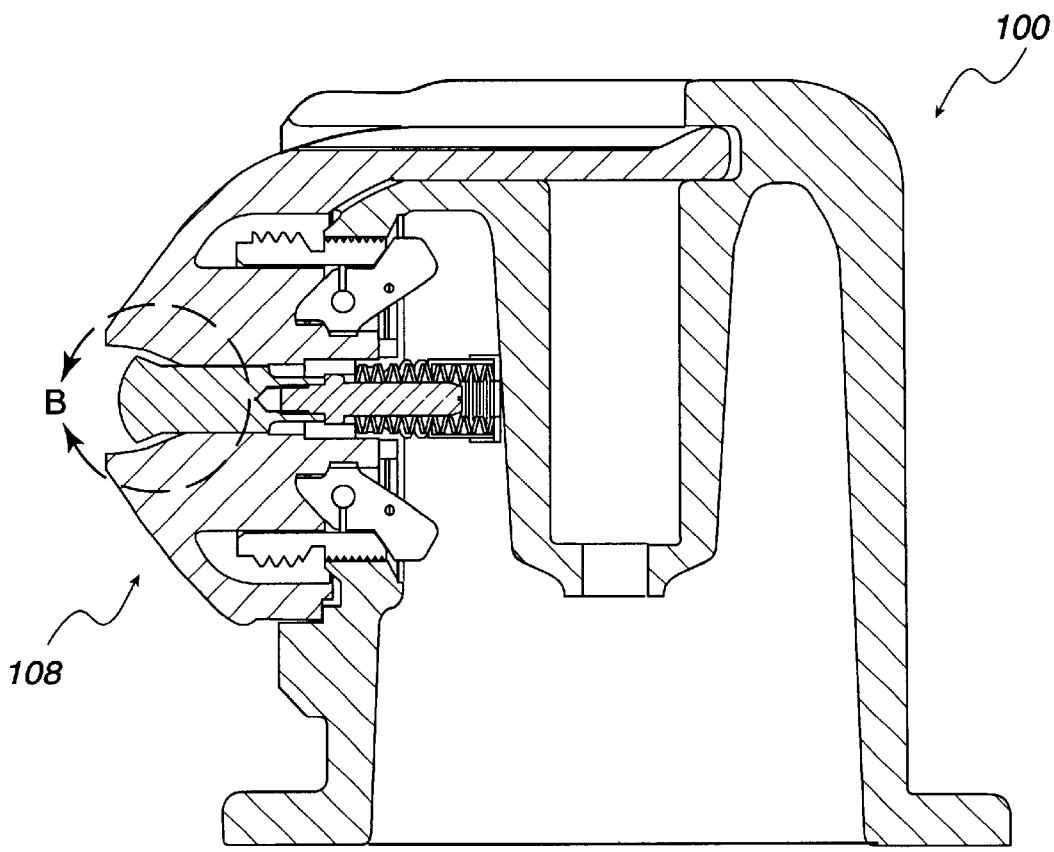
Figures 2, 4B:
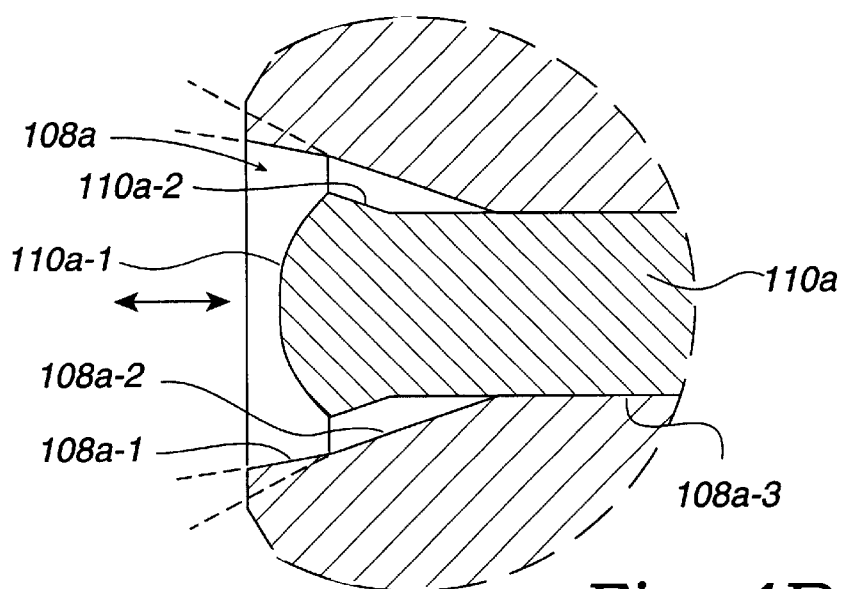

FIGS. 4B-1 and 4B-2 are cross-sectional views of locking cap 108 secured to fire hydrant body 100 in accordance with one embodiment of the invention, with FIG. 4B-2 being an enlarged view of the portion of the locking cap indicated by the circle labeled B in FIG. 4B-1. FIG. 4B-2 shows the configuration of mushroom head 110a-1 of front shaft 110a and the inner surface of locking cap 108 that defines aperture 108a in accordance with one embodiment of the invention. As shown therein, inner surfaces 108a-1, 108a-2, and 108a-3 define aperture 108a. Inner surface 108a-1 defines a first cone and inner surface 108a-2 defines a second cone. When front shaft 110a is in the inward position at which the latching mechanism is released, surface 110a-2 of mushroom head 110a-1 is either in contact with or very close to surface 108a-2. When front shaft 110a is in the outward position at which the latching mechanism is locked, the distance between surface 108a-1 and surface 110a-2 of mushroom head 110a-1 is shorter than the distance between surface 110a-2 and the extension of surface 108a-2. Thus, the "double coning" provided by surface 108a-1 minimizes the available space around mushroom head 110a-1 in which vandals may attempt to insert tools or other objects. In the event a vandal successfully lodges a tool or other object in the space around mushroom head 110a-1, the latching mechanism will not release because the tool or object will prevent front shaft 110a from reaching the position at which the latching mechanism is released, i.e., the position at which surface 110a-2 of mushroom head 110a-1 is in contact with surface 108a-2.

FIGS. 4C-1 and 4C-2 are side views of locking cap 108, with FIG. 4C-2 being an enlarged view of the portion of the locking cap indicated by the circle labeled C in FIG. 4C-1.

FIG. 4C-2 shows one of lugs 108b formed on the surface of locking cap 108. Lugs 108b serve as the gripping points for the removal tool that is used to remove locking cap 108. As shown in FIG. 4C-2, lug 108b is provided with a back chamfer that makes it difficult for a vandal to grip the lug with a standard tool. When the removal tool is attached to the locking cap and force is applied to the compression pin, this chamfer acts as an inclined plane. The force applied to this inclined plane tends to spread the gripping arms away from the center of the removal tool. Therefore, the gripping arms must be structurally stiff enough to resist this spreading. Additional details regarding the removal of the locking cap are described below with reference to FIGS. 5A–5E.

FIG. 4D is a front view of locking cap 108 that illustrates exemplary locations at which lugs 108b may be disposed around the periphery of the locking cap. As shown in FIG. 4D, three lugs 108b-1, 108b-2, and 108b-3 are radially spaced around the periphery of locking cap 108. Using the center of tongue 108c that extends from locking cap 108 as the zero degree reference point and proceeding clockwise around the locking cap, lug 108b-1 may be located at about 95 degrees to about 115 degrees, lug 108b-2 may be located at about 195 degrees to about 215 degrees, and lug 108b-3 may be located at or about 335 degrees to about 355 degrees, provided that no two adjacent lugs are separated by 90 degrees and no two lugs diametrically oppose one another, i.e., are separated by 180 degrees. The primary reason for these conditions is to make sure that standard tools cannot be used to grab the lugs. It will be apparent to those skilled in the art that the number and location of the lugs can be varied from that shown in FIG. 4D to meet the needs of particular situations.

Figure 5A:
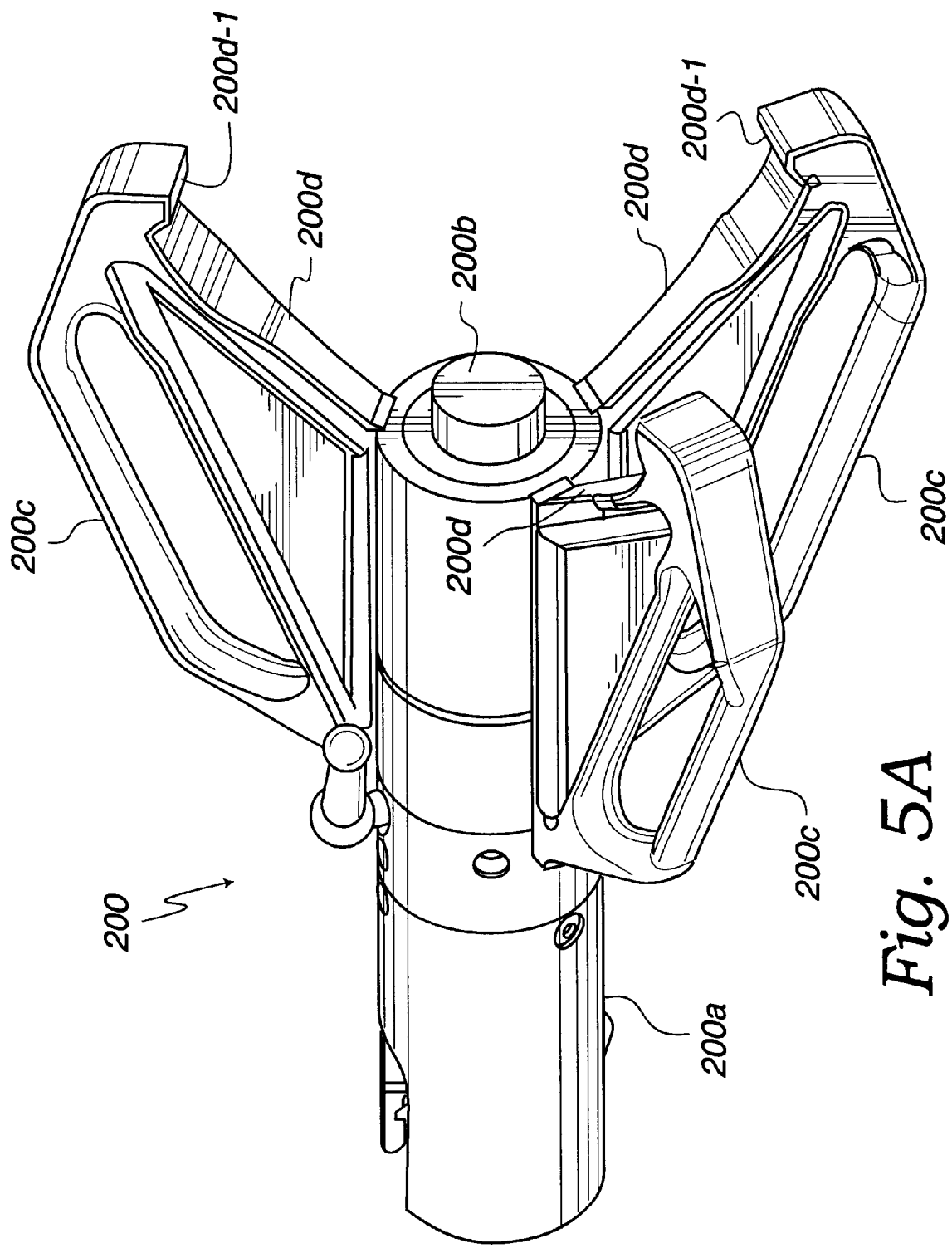
FIG. 5A is a side view of the removal tool in accordance with one embodiment of the invention.
Figures 1, 5B:
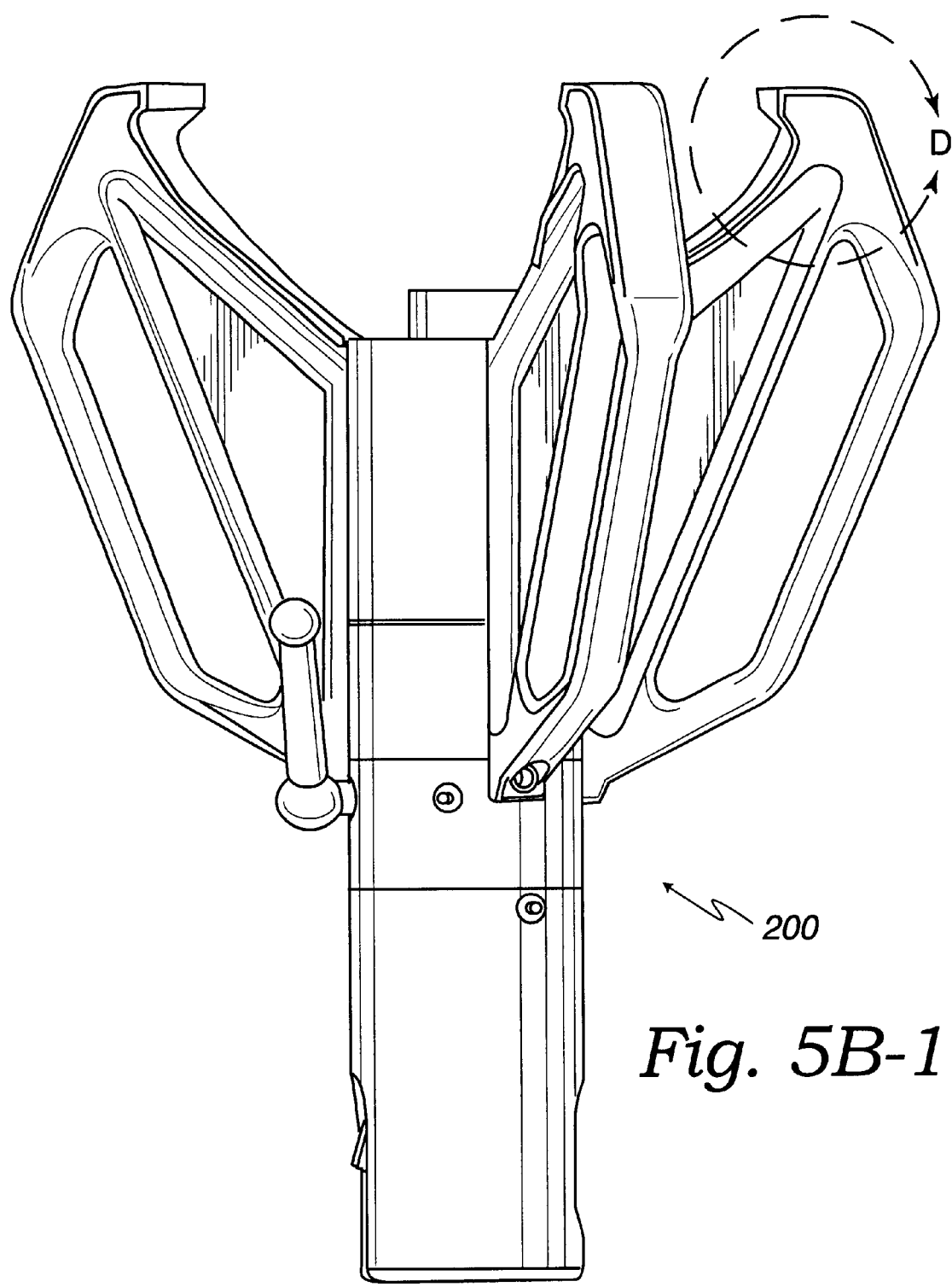

FIG. 5A is a side view of removal tool 200 in accordance with one embodiment of the invention. As shown in FIG. 5A, removal tool 200 includes body 200a in which compression pin 200b is movably disposed, three handles 200c, and three gripping arms 200d that extend from body 200a. Each gripping arm 200d has claw 200d-1 at the end thereof for grabbing one of the lugs 108b (see FIGS. 4C-1 and 4C-2) provided on locking cap 108. FIGS. 5B-1 and 5B-2 show another view of removal tool 200, with FIG. 5B-2 being an enlarged view of the portion of the removal tool indicated by the circle labeled D in FIG. 5B-1. As shown in FIG. 5B-2, claw 200d-1 of gripping arm 200d is configured to grab one of the lugs 108b provided on locking cap 108.

FIG. 5C is a perspective view of hand wrench 202 in accordance with one embodiment of the invention. Hand wrench 202 is used to operate removal tool 200 to advance compression pin 200b as well as to open and close the valve control device disposed within the fire hydrant body. To these ends, hand wrench 202 includes mating connector 202a and valve wrench 202b. As shown in FIG. 5C, valve wrench 202b has a pentagonal shape and a length sufficient to reach the valve control device through valve access hole 100b-3d (see FIG. 2).

Figure 5D:
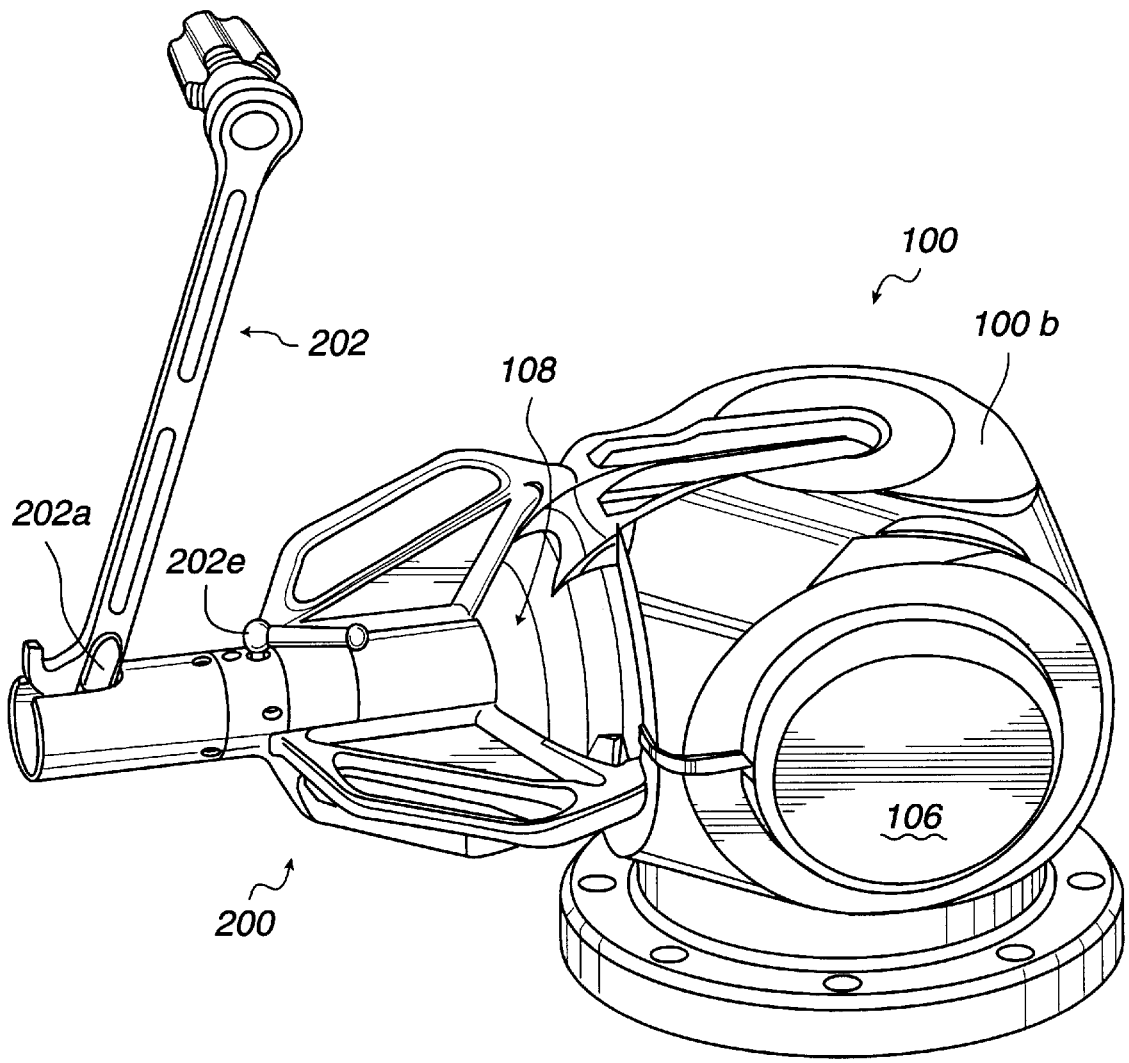
FIG. 5D shows the removal tool positioned on the locking cap and the hand wrench positioned on the removal tool for removal of the locking cap in accordance with one embodiment of the invention.

FIG. 5D shows removal tool 200 positioned on locking cap 108 and hand wrench 202 positioned on the removal tool for removal of the locking cap in accordance with one embodiment of the invention. As shown in FIG. 5D, removal tool 200 is positioned on locking cap 108 such that claws 200d-1 of gripping arms 200d grab lugs 108b on the locking cap. The embodiment of removal tool 200 shown in FIG. 5D uses a hydraulic jack to advance the compression pin and thereby remove the locking cap. Alternatively, the compression pin may be advanced by a screwjack, compressed air piston, or other suitable means for applying force to the compression pin. To advance the compression pin with the hydraulic jack, handle 200e is first moved into the position that causes the pressure of the hydraulic fluid to increase when the hydraulic pump is operated. Mating connector 202a of hand wrench 202 is then coupled to a pump lever (not shown) provided on removal tool 200 so that the hand wrench can be used to operate the hydraulic pump and thereby cause compression pin 200b (see FIG. 5A) to advance. By advancing compression pin 200b in this manner, the latching mechanism on the interior of locking cap 108 can be released so that the locking cap can be removed from head 100b of fire hydrant body 100. As mentioned above, the operation of the latching mechanism is described in detail below with reference to FIGS. 6A–6C, 7A-1, 7A-2, and 7B.

FIG. 5E shows locking cap 108 and removal tool 200 after the locking cap has been removed from head 100b. As shown in FIG. 5E, tongue 108c extends from locking cap 108. As described above, tongue 108c is disposed in valve access channel 100b-3 (see FIG. 1) formed in the upper portion of head 100b and prevents access to a valve control device disposed within the fire hydrant body. When locking cap 108 is removed from the head of the hydrant body, removal tool 200 remains positioned on the locking cap because latching mechanism 150 applies force on the removal tool, as will explained in more detail below. To prevent vandals from stealing the locking cap 108 and removal tool 200 during a fire, a steel cable (not shown) attached to the removal tool may be looped around the hydrant body before a hose is attached thereto. Once a hose is attached to the hydrant body, the hose will prevent the steel cable attached to the removal tool from being removed from the hydrant body.

Figure 6A:
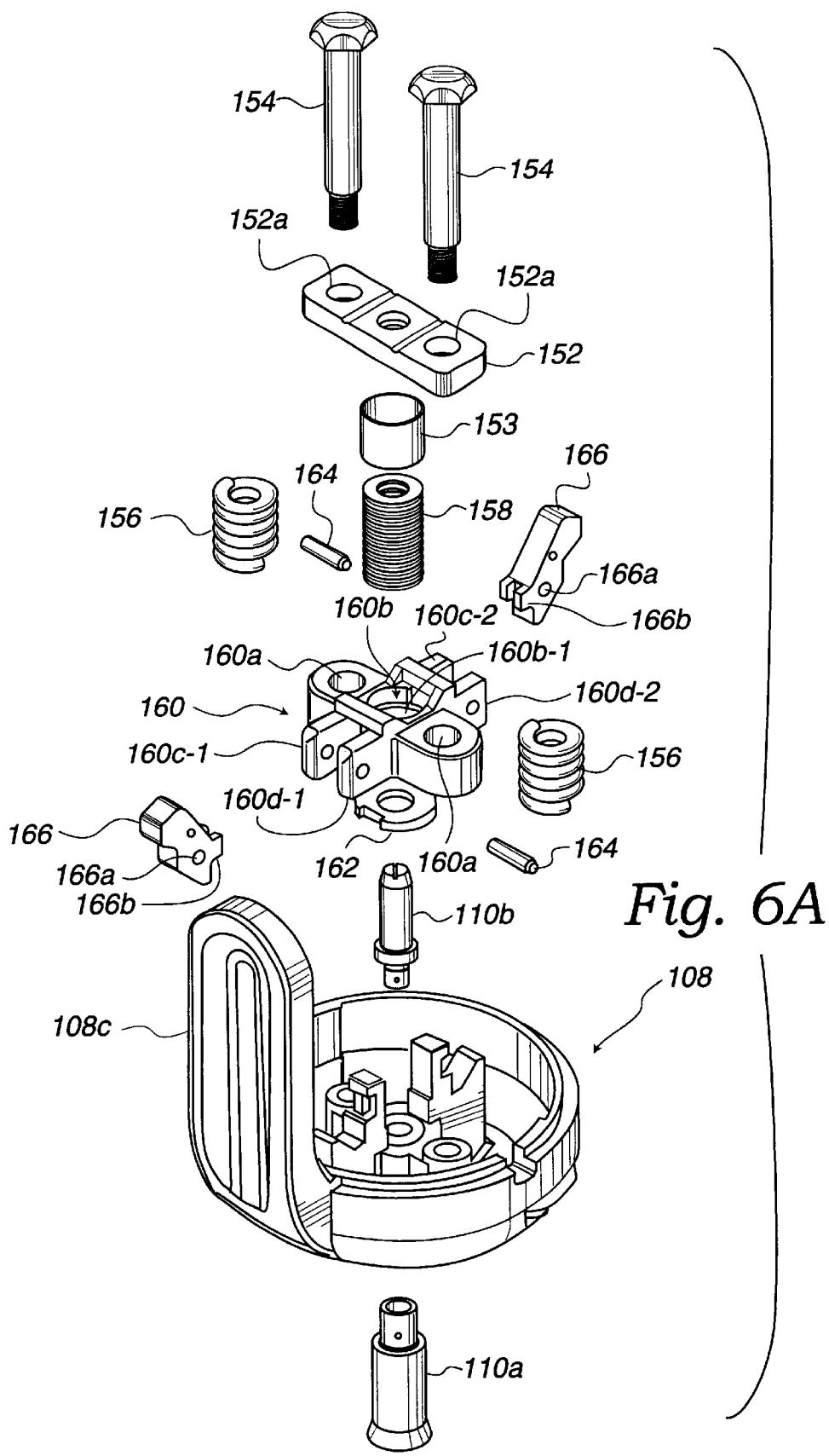
FIG. 6A is an exploded view of the components of the latching mechanism in accordance with one embodiment of the invention.

FIG. 6A is an exploded view of the components of latching mechanism 150 in accordance with one embodiment of the invention. As shown in FIG. 6A, bridge plate 152 has holes 152a formed therein and has cylinder 153 mounted thereon. Hold down bolts 154 are disposed in holes 152a of bridge plate 152. Main springs 156 are disposed on hold down bolts 154. Disc springs 158 are situated in cylinder 153 mounted on bridge plate 152. Shaft 110, which is formed by joining front shaft 110a and back shaft 110b, extends through disc springs 158. In one embodiment, disc springs 158 are Belleville washers.

Pivot frame 160 includes a pair of holes 160a through which hold down bolts 154 extend so that the threaded ends thereof can be secured to the inner surface of locking cap 108. Pivot frame 160 also includes recessed portion 160b having aperture 160b-1 therethrough. Support washer 162 and disc springs 158 are disposed in recessed portion 160b. Pivot frame 160 further includes two pairs of opposing plates: 160c-1 and 160d-1 and 160c-2 and 160d-2. Each of these plates has a hole therethrough configured to receive dowel pin 164. Tongs 166, which have holes 166a therethrough, are pivotally mounted to the opposing plates of pivot frame 160 by inserting dowel pins 164 through the respective holes in the opposing plates and the tongs. Tongs 166 are provided with cam ledges 166b to facilitate rotation of the tongs between a locked position and a release position, as described in more detail later.

Figure 6B:
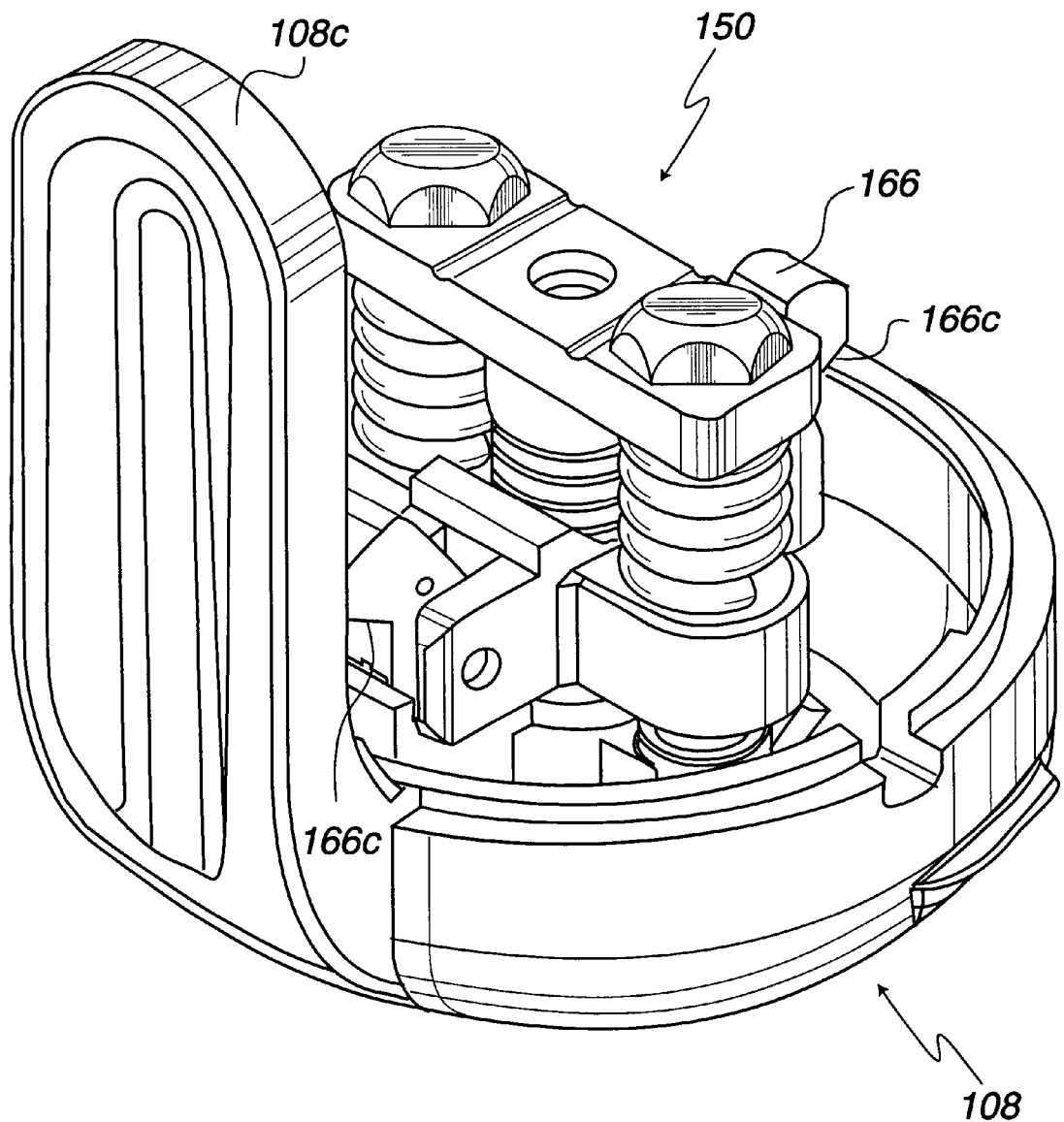
FIG. 6B shows the latching mechanism in the locked position in accordance with one embodiment of the invention.
Figure 6C:
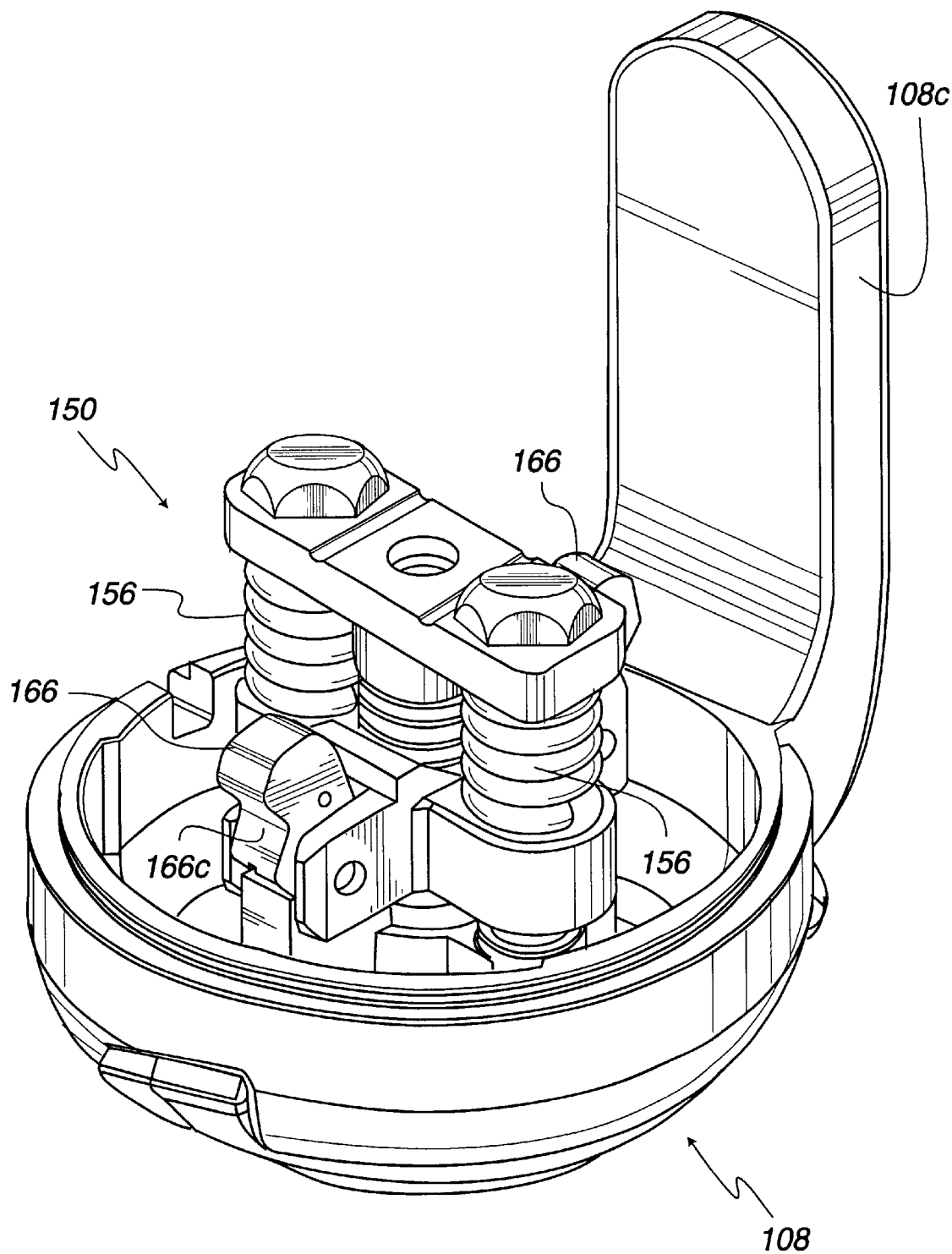
FIG. 6C shows the latching mechanism in the release position in accordance with one embodiment of the invention.

FIG. 6B shows latching mechanism 150 in the locked position. As shown in FIG. 6B, tongs 166 are positioned such that surfaces 166c will engage the inner surface of head 100b of fire hydrant body 100 and thereby prevent locking cap 108 from being removed therefrom. FIG. 6C shows latching mechanism 150 in the release position. As shown in FIG. 6C, tongs 166 have been rotated inwardly, i.e., toward springs 156, such that surfaces 166c will clear the inner surface of head 100b so that locking cap 108 can be removed therefrom.

Figures 1, 7A:
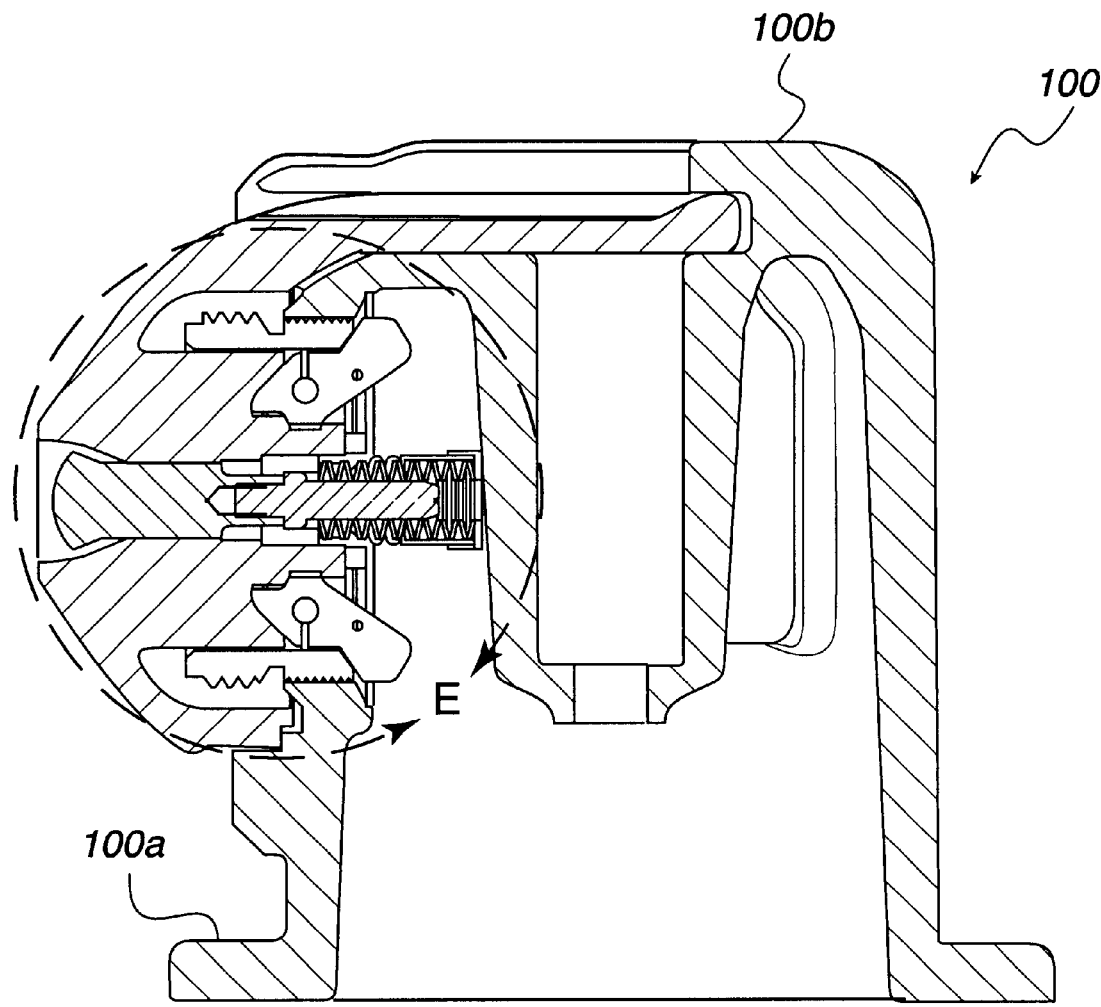
Figures 2, 7A:
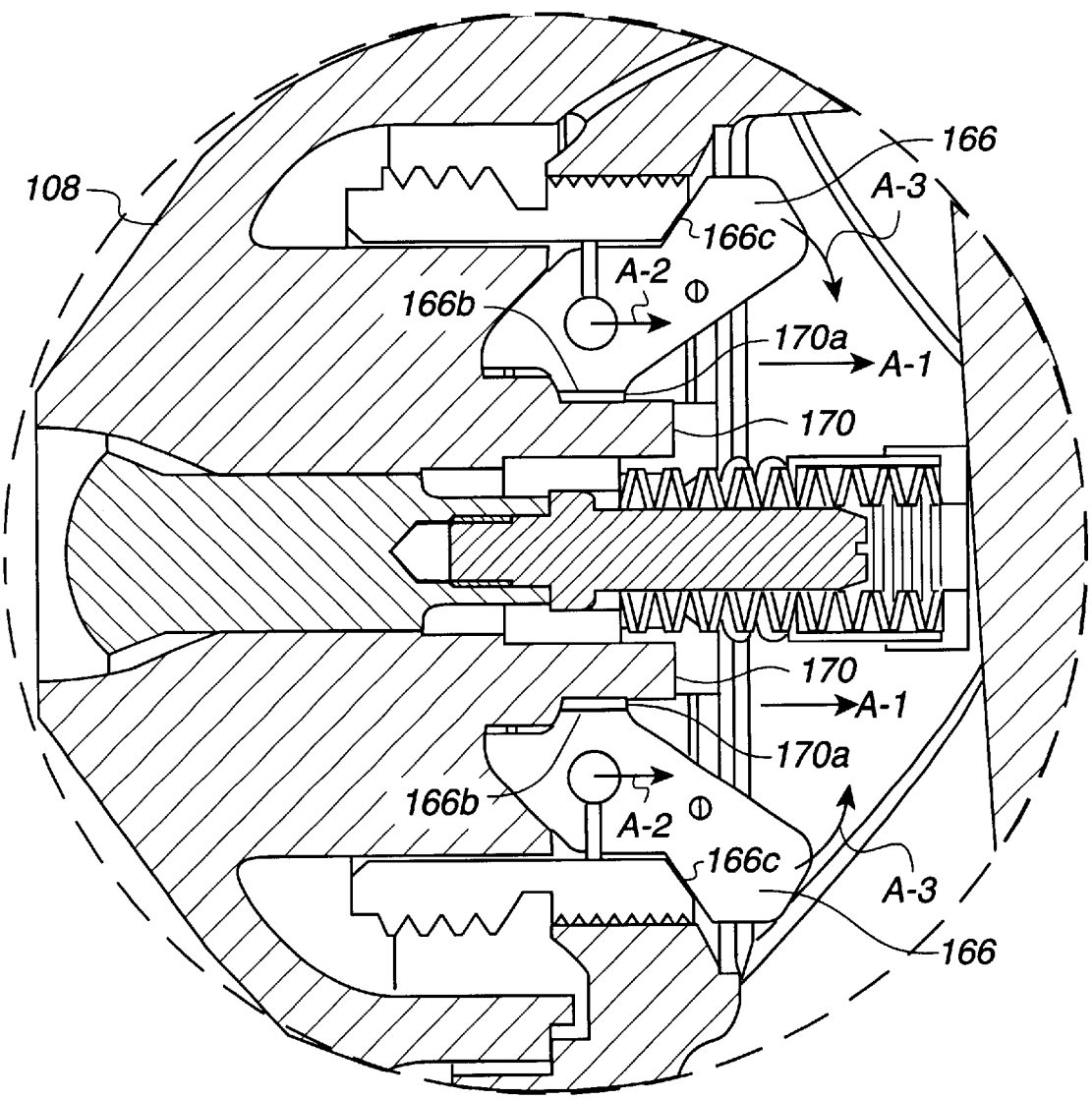

FIGS. 7A-1 and 7A-2 are cross-sectional views of locking cap 108 secured to fire hydrant body 100 in accordance with one embodiment of the invention, with FIG. 7A-2 being an enlarged view of the portion of the locking cap indicated by the circle labeled E in FIG. 7A-1. FIG. 7A-2 shows tongs 166 of the latching mechanism in the locked position. In particular, surfaces 166c of tongs 166 engage the inner surface of head 100b of hydrant body 100 and thereby prevent the locking cap from being removed from the hydrant body. It will be apparent to those skilled in the art that the shapes of the contacting surfaces of the tong and the hydrant body may be varied from that shown in FIGS. 7A-1 and 7A-2 to meet the needs of particular situations. Posts 170, which extend from the inner surface of locking cap 108, are provided with notches 170a. When springs 156 are compressed (see, e.g., FIG. 6C), pivot frame 160 moves in the direction indicated by arrow A-1. This causes tongs 166 to move in the same direction as indicated by arrows A-2. As tongs 166 move, cam ledges 166b engage the surfaces of notches 170a formed in posts 170. The contact between the cam ledges and the notches causes tongs 166 to swing in the directions indicated by arrows A-3 and thereby disengage from the inner surface of head 100b of hydrant body 100.

Figure 7B:
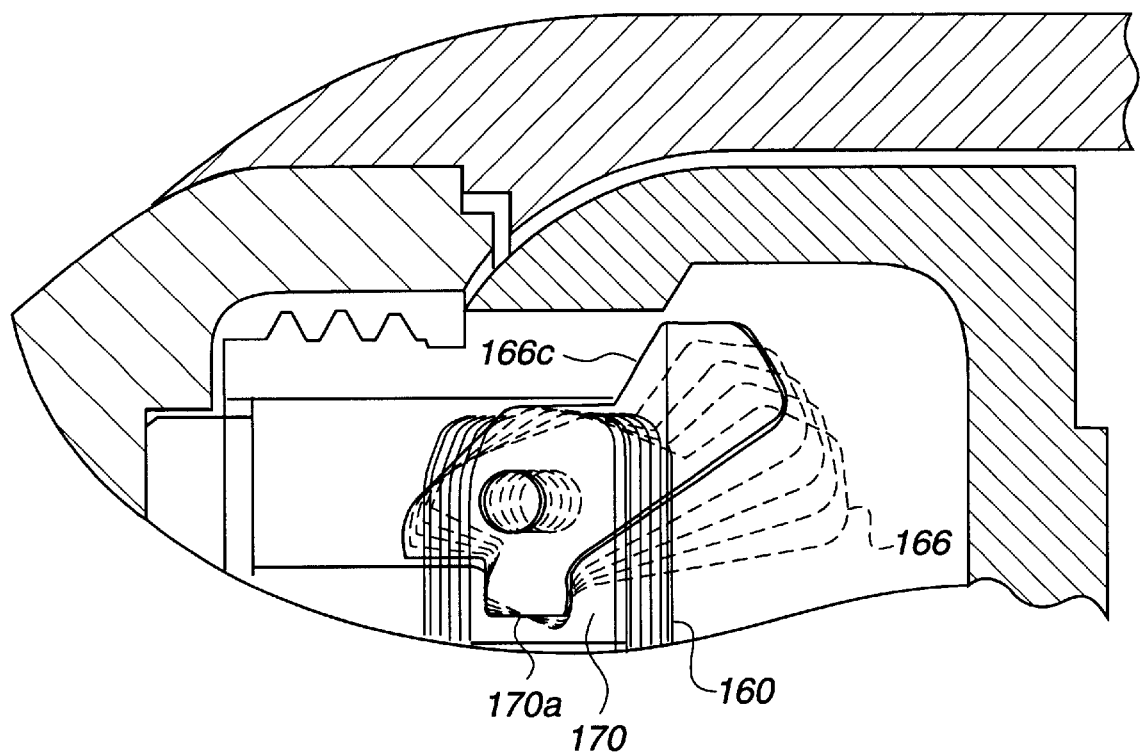
FIG. 7B shows the sequential motion of the tong and the pivot frame as the cam latching mechanism is moved from the locked position to the release position.

FIG. 7B shows the sequential motion of tong 166 and pivot frame 160 as the cam latching mechanism is moved from the locked position to the release position. It is noted that the angled configuration of the engaging surface 166c of tong 166 shown in FIG. 7B is not necessarily the preferred shape of this surface. Those skilled in the art will recognize that the preferred shape of the engaging surface 166c of tong 166 depends on the shape of the inner surface of the hydrant body. Thus, it may be necessary to modify the shape of the engaging surfaces of the tongs to accommodate different hydrant bodies.

The manner in which latching mechanism 150 is moved between the locked position shown in FIG. 6B and the release position shown in FIG. 6C will now be described in more detail. As shown in FIG. 5D, removal tool 200 is positioned on locking cap 108. Hand wrench 202 is then used to advance compression pin 200b (see FIG. 5A) into contact with mushroom head 110a-1 of front shaft 110a, which, as described above, is joined to back shaft 110b to form shaft 110. Once compression pin 200b contacts shaft 100, shaft 110 undergoes a first stage of travel in which disc springs 158 (see, for example, FIG. 6A) are compressed. During this first stage of travel, pivot frame 160 to which tongs 166 are pivotally attached (see, for example, FIG. 6A) does not move. Once shaft 110 compresses disc springs 158, shaft 110 engages pivot frame 160 and undergoes a second stage of travel in which the pivot frame is moved against the resistance of main springs 156. This movement of pivot frame 160 moves cam ledges 166b of tongs 166 into contact with notches 170a in posts 170 (see FIG. 7A-2). Continued movement of pivot frame 160 while cam ledges 166b are in contact with notches 170a in posts 170 causes tongs 166 to rotate from the locked position to the release position, as shown in FIG. 7B. Thus, latching mechanism 150 constitutes a short travel, quick action cam latching mechanism.

Figures 1, 8:
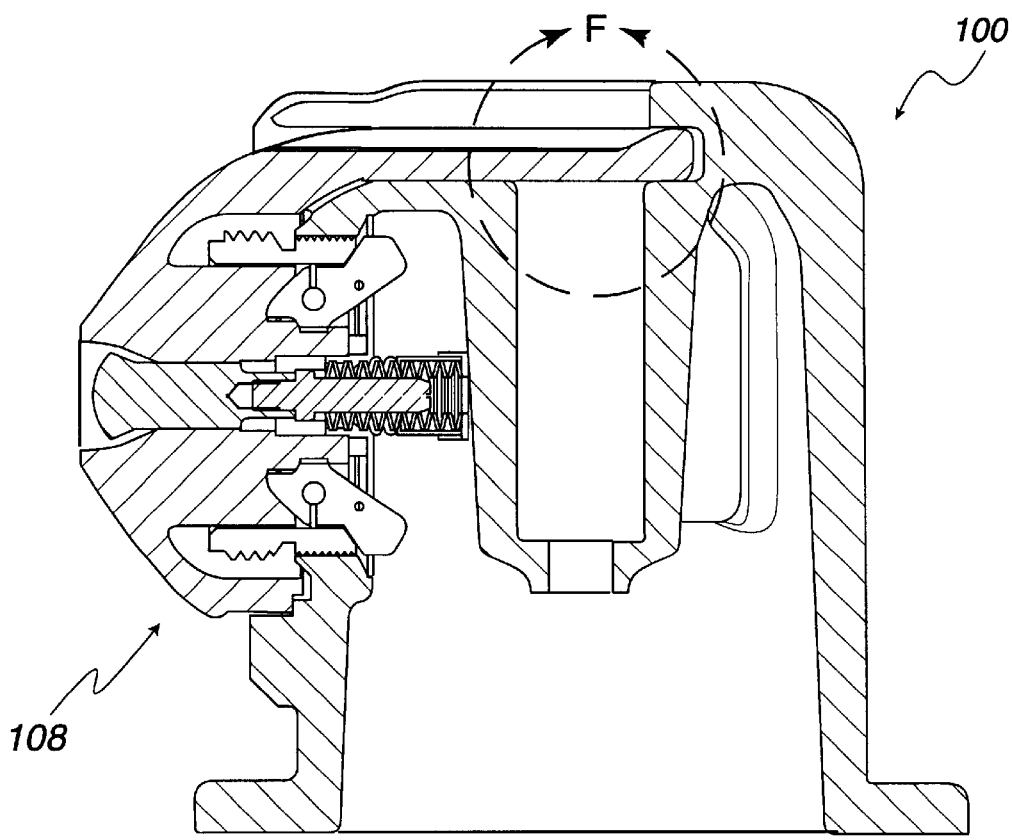
Figures 2, 8:
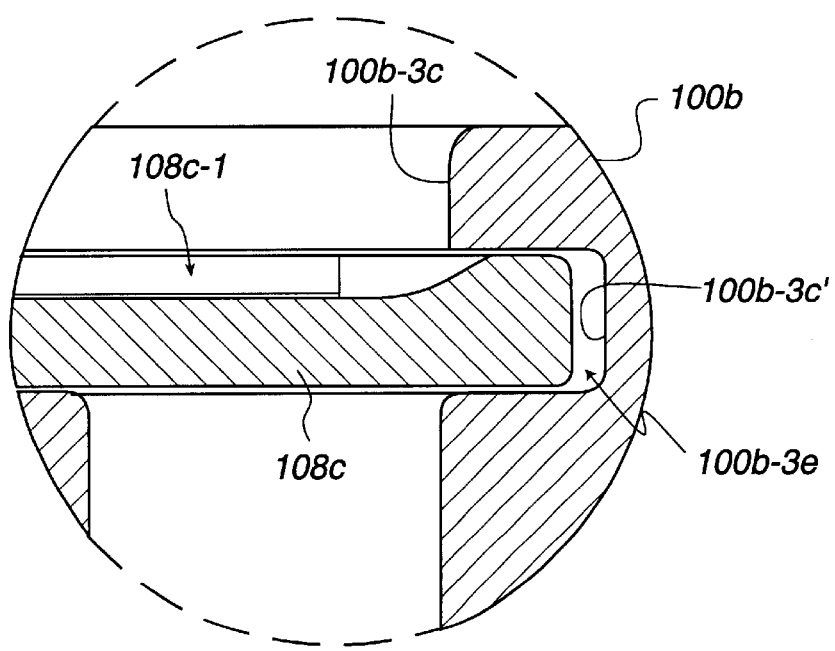

FIGS. 8-1 and 8-2 are cross-sectional views of locking cap 108 secured to fire hydrant body 100 in accordance with one embodiment of the invention, with FIG. 8-2 being an enlarged view of the portions of the locking cap and fire hydrant body indicated by the circle labeled F in FIG. 8-1. As shown in FIG. 8-2, the relative positioning of upper channel end wall 100b-3c and lower channel end wall 100b-3c' of valve access channel 100b-3 defines channel extension 100b-3e. When locking cap 108 is mounted on head 100b, the portion of head 100b above channel extension 100b-3e covers the tip of tongue 108c that extends from the locking cap and thereby prevents vandals from being able to wedge a tool, e.g., a pry bar, under the tip of the tongue in an effort to break into fire hydrant body 100. If desired, channel sidewalls 100-3b (see FIG. 2) may be configured to have staggered upper and lower sidewalls so that the sides of the tongue also are covered. As shown in FIG. 8-2, channel 108c-1 formed in the top surface of tongue 108c is sloped downwardly toward the front face of locking cap 108 to prevent water from collecting on the tongue.

The locking fire hydrant of the present invention can effectively withstand aggressive attempts to gain unauthorized access thereto because the hydrant body shields the components mounted thereon, e.g., the locking cap and the auxiliary cap, from being accessed by unauthorized tools. Consequently, the locking fire hydrant of the present invention is more reliable than conventional fire hydrants used in major metropolitan areas. In addition, the locking fire hydrant of the present invention is readily accessible in that firefighters can remove the locking cap from the hydrant body quickly, e.g., in about 5 seconds, using the removal tool. By essentially eliminating unauthorized use thereof, the locking fire hydrant of the present invention not only conserves water, but also ensures that there will be sufficient water pressure available to move water from an open hydrant to an engine pumper. The locking fire hydrant also prevents damage to fire hydrants caused by foreign objects placed in the hydrants when unauthorized persons open them. Thus, the locking fire hydrant of the present invention helps firefighters get water to fires quickly and reliably and thereby helps create a safer environment for firefighters and the communities they serve.

In summary, the present invention provides a locking fire hydrant that prevents unauthorized users from gaining access to the hydrant. The invention has been described herein in terms of several exemplary embodiments. Other embodiments of the invention will be apparent to those skilled in the art from consideration of the specification and practice of the invention. By way of example, the shapes of the fire hydrant body and the locking cap may be varied from that shown and described herein. In addition, if desired, the auxiliary outlet port and the auxiliary cap may be omitted from the locking fire hydrant or the locking fire hydrant may be provided with more than one auxiliary outlet port and a corresponding number of auxiliary caps. The embodiments and preferred features described above should be considered exemplary, with the scope of the invention being defined by the appended claims and their equivalents.

What is claimed is:

1. A locking fire hydrant, comprising:
 a fire hydrant body having an outlet port, a valve access hole, and an outer surface with a recess defined therein, the recess being configured to receive a locking cap for closing off the outlet port and the valve access hole; and
 a locking cap for closing off the outlet port and the valve access hole mounted on the fire hydrant body, the locking cap being mounted on the fire hydrant body such that the locking cap is received in the recess defined in the outer surface of the fire hydrant body.

2. The locking fire hydrant of claim 1, wherein the locking cap is secured to the fire hydrant body with a short travel, quick action latching mechanism that includes tongs configured to grab an inner surface of the fire hydrant body.

3. The locking fire hydrant of claim 2, wherein the short travel, quick action latching mechanism is actuated by a shaft that extends through an aperture in the locking cap.

4. The locking fire hydrant of claim 3, wherein the shaft has a mushroom head and the aperture in the locking cap is defined by a first surface that defines a first cone and a second surface that defines a second cone.

5. The locking fire hydrant of claim 1, wherein an outer surface of the locking cap is provided with lugs configured to serve as gripping points for a tool configured to remove the locking cap.

6. The locking fire hydrant of claim 5, wherein the lugs are provided with a back chamfer.

7. The locking fire hydrant of claim 5, wherein the lugs are radially spaced around a perimeter of the locking cap at unequal radial positions such that no two lugs are diametrically opposed to one another.

8. A locking fire hydrant, comprising:
a fire hydrant body having a head that defines a hollow interior, the head having a main outlet port and a valve access hole, the head further having an outer surface configured to define a main cap recess that surrounds the main outlet port and a valve access channel that extends between the main cap recess and the valve access hole; and
a locking cap mounted on the fire hydrant body, the locking cap being configured to close off the main outlet port and the valve access hole, and the locking cap being mounted on the fire hydrant body such that the main cap recess and the valve access channel shield an interface between the locking cap and the head of the fire hydrant body from access by unauthorized tools.

9. The locking fire hydrant of claim 8, wherein the head of the fire hydrant body has an auxiliary outlet port, and the outer surface of the head is configured to define an auxiliary cap recess that surrounds the auxiliary outlet port and an auxiliary cap locking slot that extends between the main cap recess and the auxiliary cap recess, and the locking fire hydrant further comprises:
an auxiliary cap for closing off the auxiliary outlet port mounted on the fire hydrant body such that the auxiliary cap recess shields an interface between the auxiliary cap and the head of the fire hydrant body from access by unauthorized tools, the auxiliary cap having a pivot arm with a ledge at an end thereof, the pivot arm being configured to be seated in the auxiliary cap locking slot such that the ledge extends into the main cap recess.

10. The locking fire hydrant of claim 9, wherein the locking cap is mounted on the fire hydrant body such that the locking cap pins the ledge of the auxiliary cap pivot arm in the main cap recess and thereby locks the auxiliary cap to the fire hydrant body.

11. The locking fire hydrant of claim 8, wherein the locking cap has a tongue extending therefrom, and the valve access channel is configured to receive the tongue.

12. The locking fire hydrant of claim 8, wherein the locking cap is secured to the fire hydrant body with a short travel, quick action latching mechanism that includes tongs configured to grab an inner surface of the fire hydrant body.

13. The locking fire hydrant of claim 12, wherein the short travel, quick action latching mechanism is actuated by a shaft that extends through an aperture in the locking cap.

14. The locking fire hydrant of claim 13, wherein the shaft has a mushroom head and the aperture in the locking cap is defined by a first surface that defines a first cone and a second surface that defines a second cone.

15. The locking fire hydrant of claim 8, wherein an outer surface of the locking cap is provided with lugs configured to serve as gripping points for a tool configured to remove the locking cap.

16. The locking fire hydrant of claim 15, wherein the lugs are provided with a back chamfer.

17. The locking fire hydrant of claim 15, wherein the lugs are radially spaced around a perimeter of the locking cap at unequal radial positions such that no two lugs are diametrically opposed to one another.

18. A fire hydrant body, comprising:
a head having an outlet port and a valve access hole, the head further having an inner surface and an outer surface, the inner surface defining a hollow interior and the outer surface having a recess defined therein, the recess surrounding the outlet port and extending to the valve access hole.

19. The fire hydrant body of claim 18, wherein the outlet port is a main outlet port and the head further includes an auxiliary outlet port, and the outer surface has a recess surrounding the auxiliary outlet port defined therein.

20. The fire hydrant body of claim 19, wherein the outer surface of the head has a recess that extends between the recess surrounding the main outlet port and the recess surrounding the auxiliary outlet port defined therein.

21. A method for restricting unauthorized access to a fire hydrant, comprising:
providing a fire hydrant body having an outlet port, a valve access hole, and an outer surface with a recess formed therein; and
mounting a locking cap for closing off the outlet port and the valve access hole on the fire hydrant body such that the recess shields an interface between the locking cap and the fire hydrant body from access by unauthorized tools.

22. A locking fire hydrant, comprising:
a fire hydrant body having a head that defines a hollow interior, the head having a main outlet port, an auxiliary outlet port, and a valve access hole, the head further having an outer surface configured to define a main cap recess that surrounds the main outlet port, an auxiliary cap recess that surrounds the auxiliary outlet port, an auxiliary cap locking slot that extends between the main cap recess and the auxiliary cap recess, and a valve access channel that extends between the main cap recess and the valve access hole;
an auxiliary cap for closing off the auxiliary outlet port mounted on the fire hydrant body such that the auxiliary cap recess shields an interface between the auxiliary cap and the head of the fire hydrant body from access by unauthorized tools, the auxiliary cap having a pivot arm with a ledge at an end thereof, the pivot arm being seated in the auxiliary cap locking slot such that the ledge extends into the main cap recess; and
a locking cap mounted on the fire hydrant body, the locking cap being configured to close off the main outlet port and the valve access hole, and the locking cap being mounted on the fire hydrant body such that the main cap recess and the valve access channel shield an interface between the locking cap and the head of the fire hydrant body from access by unauthorized tools, wherein the locking cap pins the ledge of the auxiliary cap pivot arm in the main cap recess and thereby locks the auxiliary cap to the fire hydrant body.

23. The locking fire hydrant of claim 22, wherein the locking cap has a tongue extending therefrom, and the valve access channel is configured to receive the tongue.

24. The locking fire hydrant of claim 22, wherein the locking cap is secured to the fire hydrant body with a short travel, quick action latching mechanism that includes tongs configured to grab an inner surface of the fire hydrant body.

25. The locking fire hydrant of claim 24, wherein the short travel, quick action latching mechanism is actuated by a shaft that extends through an aperture in the locking cap.

26. The locking fire hydrant of claim 25, wherein the shaft has a mushroom head and the aperture in the locking cap is defined by a first surface that defines a first cone and a second surface that defines a second cone.

27. The locking fire hydrant of claim 22, wherein an outer surface of the locking cap is provided with lugs configured to serve as gripping points for a tool configured to remove the locking cap.

28. The locking fire hydrant of claim 27, wherein the lugs are provided with a back chamfer.

29. The locking fire hydrant of claim 27, wherein the lugs are radially spaced around a perimeter of the locking cap at unequal radial positions such that no two lugs are diametrically opposed to one another.

* * * * *